(12) United States Patent
Lee

(10) Patent No.: US 10,805,514 B2
(45) Date of Patent: Oct. 13, 2020

(54) IMAGE PROCESSOR AND RELATED IMAGE SYSTEM

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 65 days.

(21) Appl. No.: 15/989,218

(22) Filed: May 25, 2018

(65) Prior Publication Data

US 2019/0007590 A1    Jan. 3, 2019

Related U.S. Application Data

(60) Provisional application No. 62/511,317, filed on May 25, 2017.

(51) Int. Cl.
*H04N 5/225* (2006.01)
*H04N 13/271* (2018.01)
(Continued)

(52) U.S. Cl.
CPC ........... *H04N 5/2258* (2013.01); *G01B 11/24* (2013.01); *G06T 7/521* (2017.01); *G06T 7/55* (2017.01); *G09G 5/028* (2013.01); *H04N 5/2226* (2013.01); *H04N 5/2251* (2013.01); *H04N 5/23229* (2013.01); *H04N 5/23238* (2013.01); *H04N 5/247* (2013.01); *H04N 13/128* (2018.05); *H04N 13/156* (2018.05);
(Continued)

(58) Field of Classification Search
CPC ............. H04N 5/2351; H04N 13/0239; H04N 13/0296; H04N 5/2258; H04N 5/23229; H04N 13/128; G06K 9/6267; G06K 9/4671; G06K 9/6215; G02B 27/22–26; G03B 35/00–26; G06T 7/55; G09G 5/028
USPC .............. 382/154; 352/57–65; 396/324–331; 348/46–50, 236, 239, 68, 234.46–50
See application file for complete search history.

(56) References Cited

U.S. PATENT DOCUMENTS 8,619,148 B1 * 12/2013 Watts ...................... G06T 5/006
348/218.1
2007/0159640 A1 * 7/2007 Berestov .............. H04N 13/239
356/611
(Continued)

FOREIGN PATENT DOCUMENTS

EP    0 921 677 B1    3/2003

*Primary Examiner* — Xi Wang
(74) *Attorney, Agent, or Firm* — Winston Hsu

(57) ABSTRACT

An image system for generating depth maps and color images includes a plurality of image sensors, at least one image processor, and at least one depth map generator. An image processor of the at least one image processor is coupled to at least one image sensor of the plurality of image sensors for generating luminance information represented by a first bit number and at least one color image represented by a second bit number according to at least one image captured by the at least one image sensor, wherein the at least one color image corresponds to the at least one image. A depth map generator of the at least one depth map generator is coupled to the image processor for generating a depth map corresponding to the at least one image according to the luminance information represented by the first bit number.

17 Claims, 33 Drawing Sheets

(51) Int. Cl.

| | |
|---|---|
| *H04N 13/156* | (2018.01) |
| *H04N 5/247* | (2006.01) |
| *H04N 5/222* | (2006.01) |
| *H04N 13/232* | (2018.01) |
| *H04N 13/243* | (2018.01) |
| *H04N 5/232* | (2006.01) |
| *G01B 11/24* | (2006.01) |
| *G06T 7/521* | (2017.01) |
| *G06T 7/55* | (2017.01) |
| *H04N 13/128* | (2018.01) |
| *G09G 5/02* | (2006.01) |

(52) U.S. Cl.
CPC ......... *H04N 13/232* (2018.05); *H04N 13/243* (2018.05); *H04N 13/271* (2018.05)

(56) References Cited

U.S. PATENT DOCUMENTS

| | | | |
|---|---|---|---|
| 2008/0232680 A1* | 9/2008 | Berestov | H04N 13/236 |
| | | | 382/154 |
| 2013/0010073 A1* | 1/2013 | Do | H04N 13/214 |
| | | | 348/46 |
| 2013/0208117 A1* | 8/2013 | Kamon | H04N 9/045 |
| | | | 348/148 |
| 2014/0320602 A1 | 10/2014 | Govindarao | |
| 2015/0010236 A1* | 1/2015 | Chang | G06T 5/003 |
| | | | 382/195 |
| 2016/0050407 A1 | 2/2016 | Chen | |
| 2016/0212411 A1* | 7/2016 | Lindner | G01C 11/00 |
| 2016/0323518 A1* | 11/2016 | Rivard | H04N 5/247 |
| 2018/0241927 A1* | 8/2018 | Chen | H04N 5/2351 |

\* cited by examiner

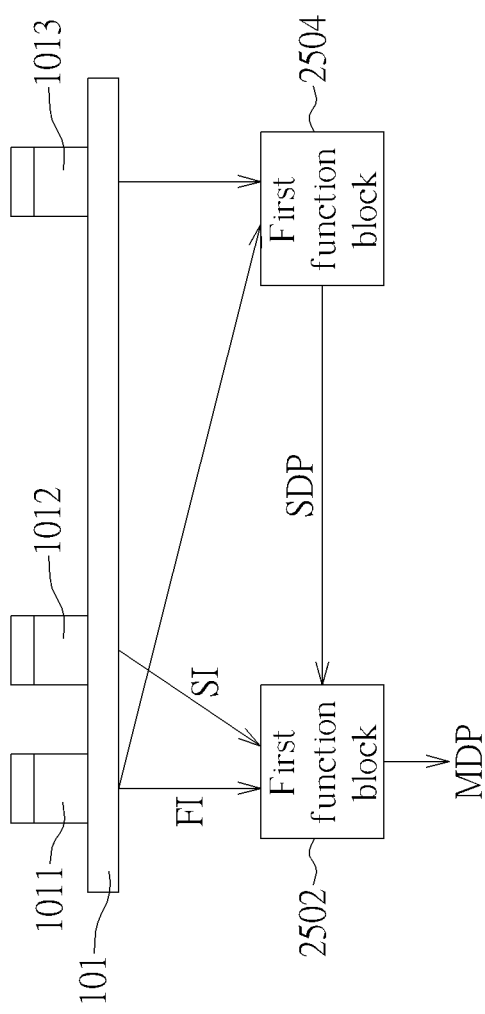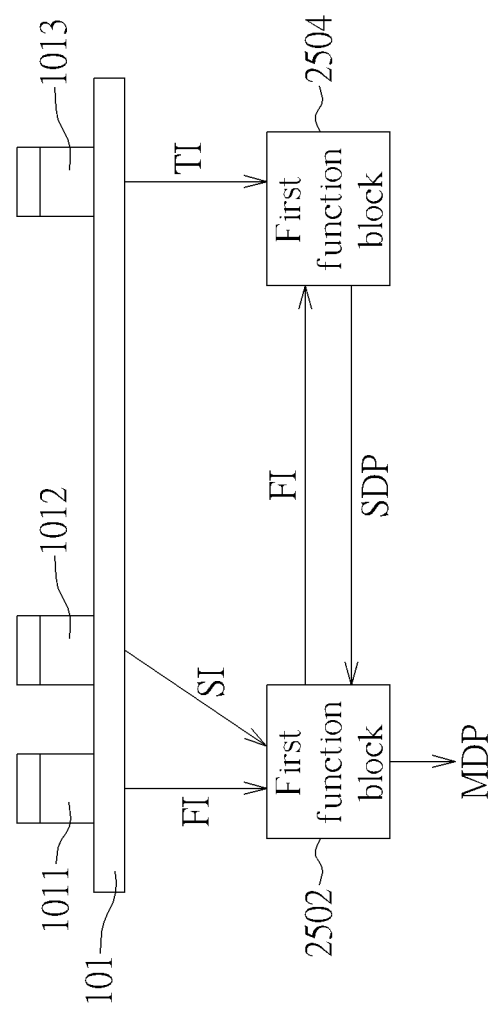

IMAGE PROCESSOR AND RELATED IMAGE SYSTEM

CROSS REFERENCE TO RELATED APPLICATION

This application claims the benefit of U.S. Provisional Application No. 62/511,317, filed on May 25, 2017 and entitled "System and Camera with Panoramic Image and Depth Information," the contents of which are incorporated herein by reference.

BACKGROUND OF THE INVENTION

1. Field of the Invention

The present invention relates to an image processor and a related image system, and particularly to an image processor and a related image system can simultaneously support to generate depth maps, generate color images, generate 360 degree color images, generate 360 degree depth maps, fuse multiple depth maps, increase a working range of a depth map, cancel an occlusion region of a depth map, and so on.

2. Description of the Prior Art

Generally, an image system provided by the prior art is single function-oriented, and cannot simultaneously provide multiple functions to a user. For example, the image system may only support to generate a depth map, or generate a color image, or generate a 360 degree color image, or generate a 360 degree depth map. However, the image system may not support fusing multiple depth maps, or increasing a working range of a depth map, or cancelling an occlusion region of a depth map. Therefore, because the image system may not be able to provide the above-mentioned multiple functions to the user, the image system is not a better image system for the user.

SUMMARY OF THE INVENTION

An embodiment of the present invention provides an image processor. The image processor includes a luminance information generator and a color information generator. The luminance information generator is coupled to at least one image sensor for generating luminance information represented by a first bit number according to data of at least one image generated by the at least one image sensor. The color information generator is coupled to the at least one image sensor for generating at least one color image represented by a second bit number according to the data.

Another embodiment of the present invention provides an image system for generating depth maps and color images. The image system includes a plurality of image sensors, at least one image processor, and at least one depth map generator. An image processor of the at least one image processor is coupled to at least one image sensor of the plurality of image sensors for generating luminance information represented by a first bit number and at least one color image represented by a second bit number according to at least one image captured by the at least one image sensor, wherein the at least one color image corresponds to the at least one image. A depth map generator of the at least one depth map generator is coupled to the image processor for generating a depth map corresponding to the at least one image according to the luminance information represented by the first bit number.

Another embodiment of the present invention provides an image system for generating color images. The image system includes a display, a storage device, a plurality of image sensors, at least one image processor, and at least one image rectification circuit. An image processor of the at least one image processor is coupled to at least one image sensor of the plurality of image sensors, and generates at least one color image according to at least one image captured by the at least one image sensor. An image rectification circuit of the at least one image rectification circuit is coupled to the image processor, and executes image rectification on the at least one color image to generate at least one rectified color image. When the display is coupled to the image rectification circuit, the display displays the at least one rectified color image and the image rectification corresponds to first geometric space conversion, and when the storage device is coupled to the image rectification circuit, the storage device stores the at least one rectified color image and the image rectification corresponds to second geometric space conversion. The first geometric space conversion is different from the second geometric space conversion.

Another embodiment of the present invention provides an image system for generating depth maps and color images. The image system includes a plurality of image sensors, at least one image processor, and at least one depth map generator. An image processor of the at least one image processor is coupled to at least one image sensor of the plurality of image sensors, and generates luminance information and at least one color image corresponding to at least one image captured by the at least one image sensor according to the at least one image. A depth map generator of the at least one depth map generator is coupled to the image processor, and generates at least one depth map corresponding to the at least one image according to the luminance information corresponding to the at least one image. The at least one color image and the at least one depth map are optionally applied to a plurality of image modes.

The present invention provides an image processor and a related image system. The image processor and the image system utilize an image processor of at least one image processor included in the image system to generate luminance information represented by a first bit number corresponding to at least one image generated by at least one image sensor and at least one color image represented by a second bit number corresponding to the at least one image according to the at least one image, and utilize a depth map generator of at least one depth map generator included in the image system to generate at least one depth map corresponding to the at least one image according to the luminance information. Therefore, compared to the prior art, because the present invention can simultaneously provide the luminance information and the at least one color image, and have structure variability, the present invention can support at least one of generating depth maps, generating color images, generating 360 degree color images, generating 360 degree depth maps, fusing multiple depth maps, increasing a working range of a depth map, and cancelling an occlusion region of a depth map. In addition, although the first bit number is greater than the second bit number, because the present invention only utilizes the luminance information to generate depth maps, generate 360 degree depth maps, fuse multiple depth maps, increase a working range of a depth map, and cancel an occlusion region of a depth map, and data amount of gray levels corresponding to the luminance information is less, the present invention does not have any bandwidth problem.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 25 is a diagram illustrating relationships between the image sensors and a first function block of the image system and a first function block according to a thirteenth embodiment of the present invention.

FIG. 26 is a diagram illustrating relationships between the image sensors and a first function block of the image system and a first function block according to another embodiment of the present invention.

DETAILED DESCRIPTION

Figure 1:
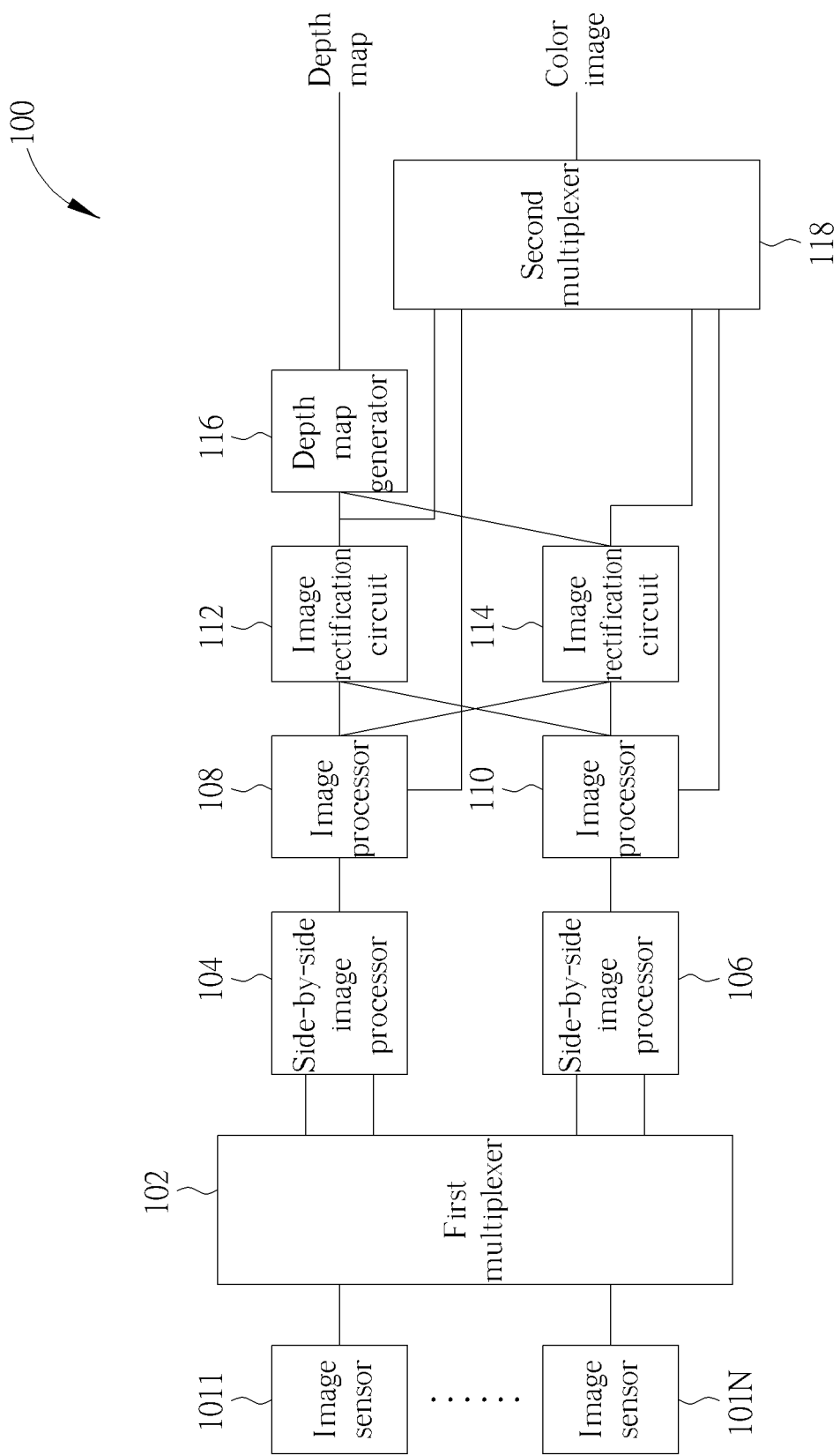
FIG. 1 is a diagram illustrating an image system for generating depth maps and color images according to a first embodiment of the present invention.

Please refer to FIG. 1. FIG. 1 is a diagram illustrating an image system 100 for generating depth maps and color images according to a first embodiment of the present invention. As shown in FIG. 1, the image system 100 includes a plurality of image sensors 1011-101N, a first multiplexer 102, side-by-side image processors 104, 106, image processors 108, 110, image rectification circuits 112, 114, a depth map generator 116, and a second multiplexer 118, wherein electrical connection relationships between the plurality of image sensors 1011-101N, the first multiplexer 102, the side-by-side image processors 104, 106, the image processors 108, 110, the image rectification circuits 112, 114, the depth map generator 116, and the second multiplexer 118 can be referred to FIG. 1, so further description thereof is omitted for simplicity, and N is an integer not less than 2. In addition, one of ordinary skill in the art should know each image sensor of the plurality of image sensors 1011-101N at least includes a lens and a sensor (e.g. a charge-coupled device (CCD) image sensor or a complementary metal-oxide-semiconductor (CMOS) transmitter image sensor.

Figure 2:
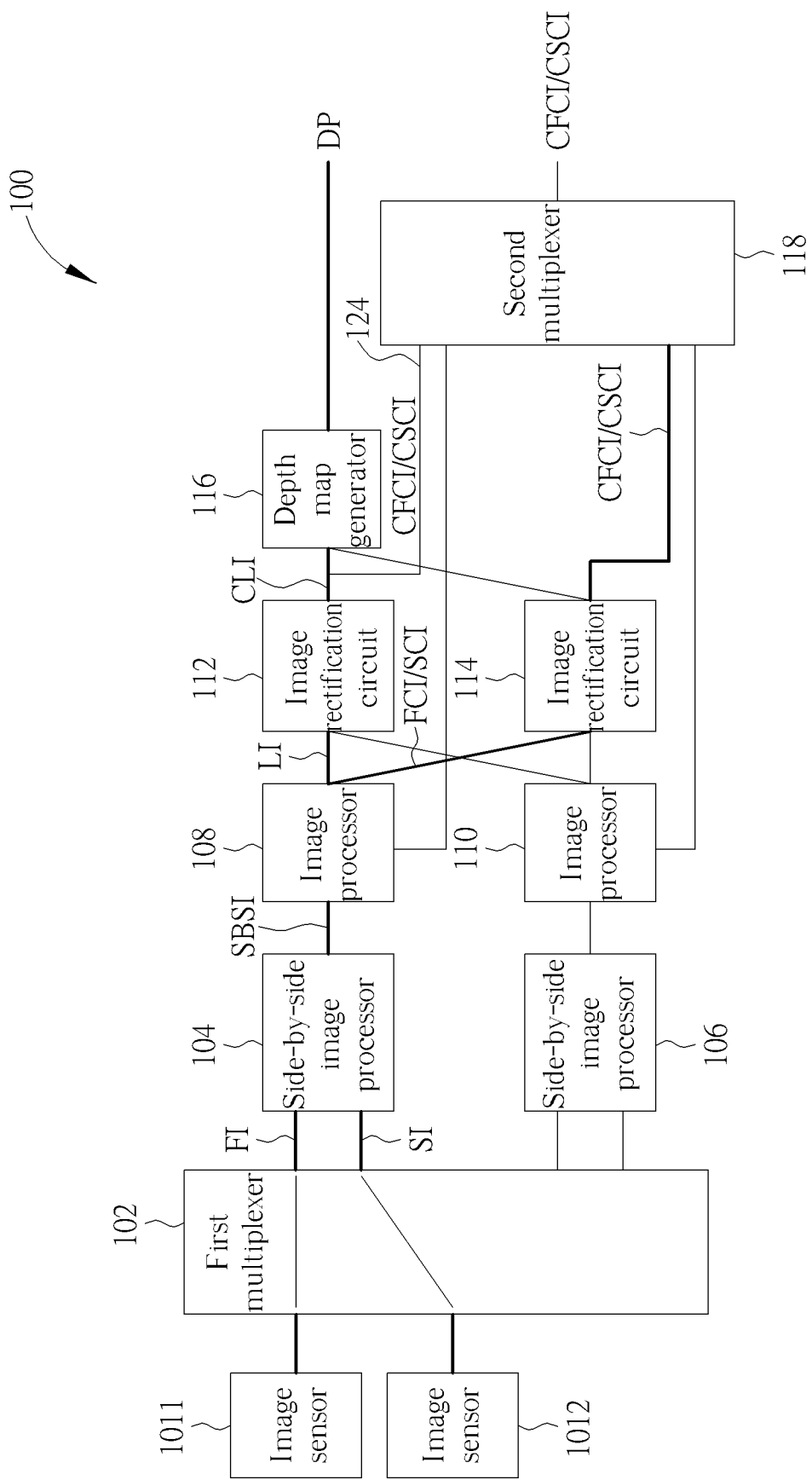
FIG. 2 is a diagram illustrating the first multiplexer of the image system being coupled to the image sensors according to a second embodiment of the present invention.
Figure 3:
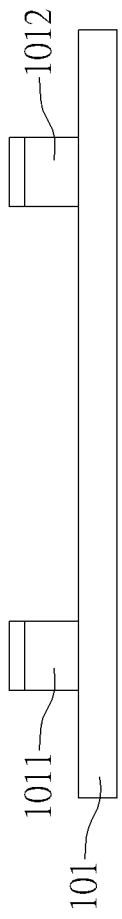
FIG. 3 is a diagram illustrating installation positions of the image sensors on a printed circuit board.
Figure 4A:
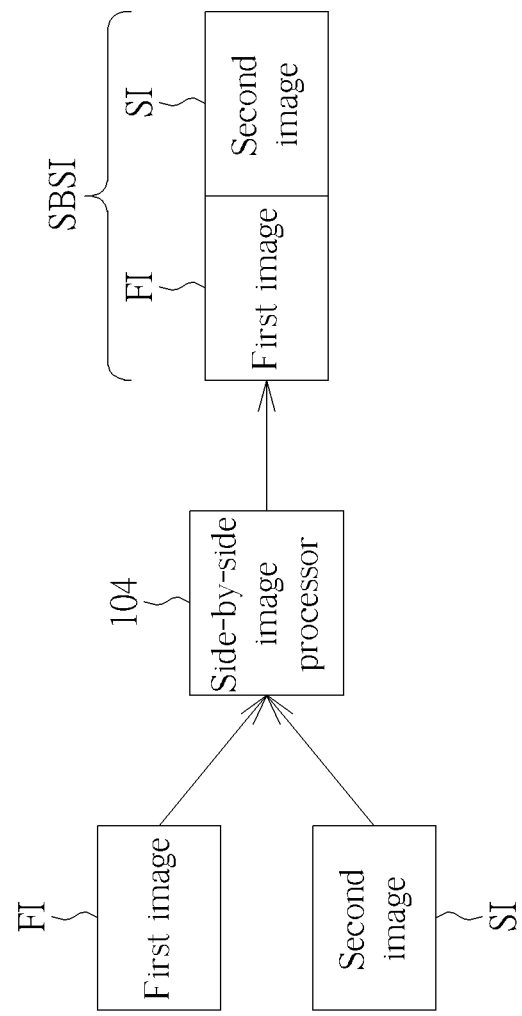
FIGS. 4A, 4B are diagrams illustrating the side-by-side image processor arranging the first image and the second image to become a side-by-side image.
Figure 4B:
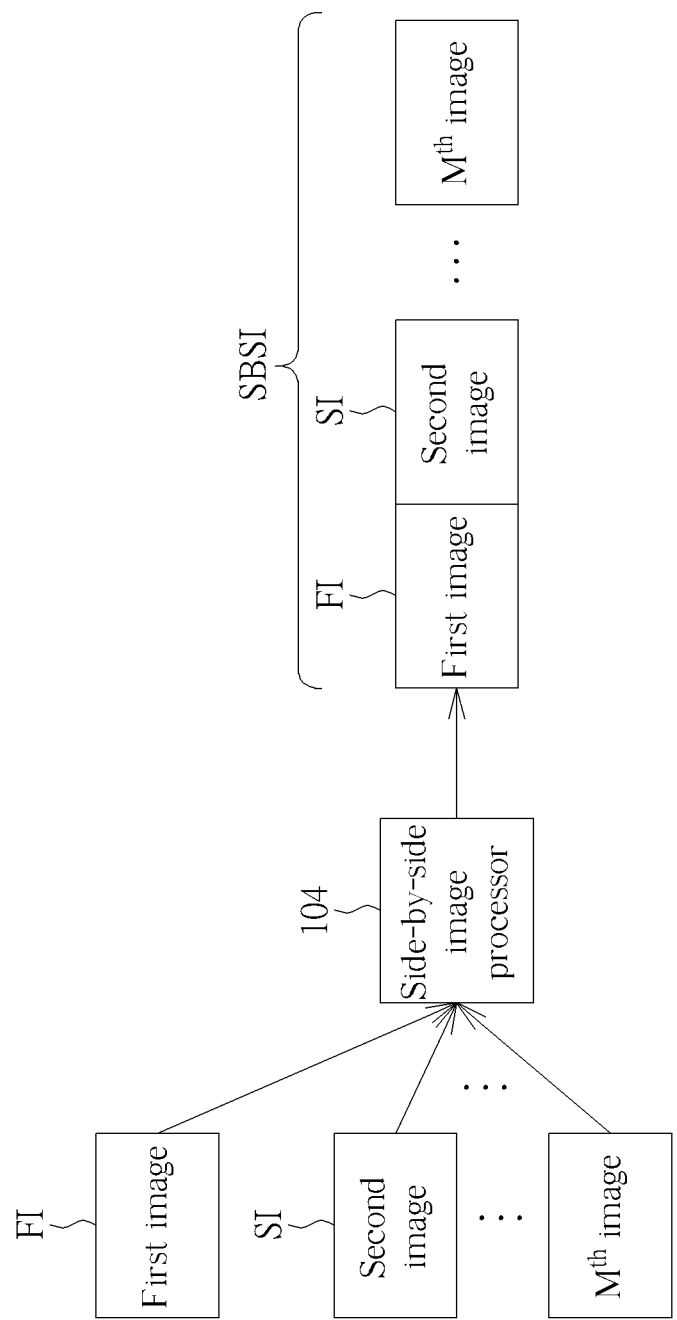
Figure 5:
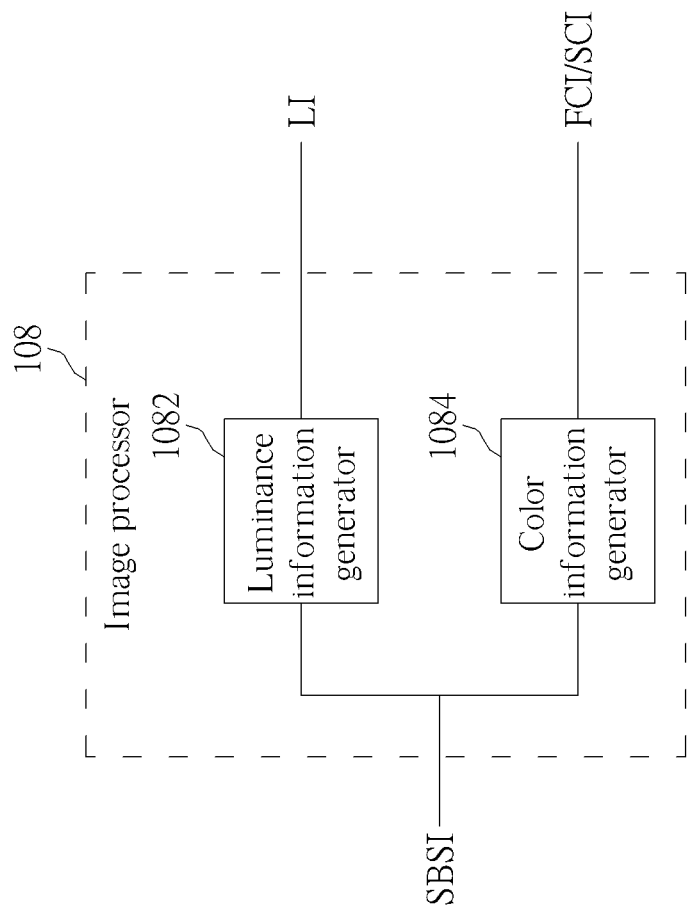
FIG. 5 is a diagram illustrating the image processor including the luminance information generator and the color information generator.

Please refer to FIG. 2. FIG. 2 is a diagram illustrating the first multiplexer 102 of the image system 100 being coupled to the image sensors 1011, 1012 according to a second embodiment of the present invention, and installation positions of the image sensors 1011, 1012 on a printed circuit board 101 can be referred to FIG. 3, wherein the first multiplexer 102 is coupled to the image sensors 1011, 1012 through the printed circuit board 101, the image sensors 1011, 1012 are bayer pattern image sensors, and thick black lines shown in FIG. 2 are signal processing paths. But, in another embodiment of the present invention, the image sensors 1011, 1012 are RGB-IR image sensors. As shown in FIG. 2, the image sensors 1011, 1012 can generate a first image FI and a second image SI respectively, wherein the first image FI is a left eye image and the second image SI is a right eye image, and the first image FI and the second image SI are raw data represented by an input bit number (e.g. 14 bit). But, the present invention is not limited to the input bit number being 14 bit. The side-by-side image processor 104 is coupled to the first multiplexer 102, wherein the side-by-side image processor 104 can receive the first image FI and the second image SI through the first multiplexer 102 and arrange the first image FI and the second image SI to become a side-by-side image SBSI (as shown in FIG. 4A). In addition, in another embodiment of the present invention, the side-by-side image processor 104 can receive more than two images (as shown in FIG. 4B). As shown in FIG. 2, the image processor 108 is coupled to the side-by-side image processor 104 for processing the first image FI and the second image SI together (because the side-by-side image SBSI includes the first image FI and the second image SI). As shown in FIG. 5, the image processor 108 includes a luminance information generator 1082 and a color information generator 1084. The luminance information generator 1082 is used for generating luminance information LI represented by a first bit number (e.g. 14 bit) according to Y components or IR components included in raw data corresponding to the first image FI and the second image SI, wherein the luminance information LI corresponds to the first image FI and the second image SI, the luminance information LI are gray levels represented by the first bit number, and the input bit number can be the same as or different from the first bit number. As shown in FIG. 5, the color information generator 1084 is used for generating a first color image FCI and a second color image SCI represented by a second bit number (e.g. 8 bit) according to the raw data corresponding to the first image FI and the second image SI, wherein the first color image FCI and the second color image SCI have R, G, B components or Y, U, V components included in the raw data corresponding to the first image FI and the second image SI, the first color image FCI and the second color image SCI correspond to the first image FI and the second image SI respectively, and the first bit number is greater than the second bit number. But, the present invention is not limited to the second bit number being 8 bit.

After the image processor 108 generates the luminance information LI, the first color image FCI, and the second color image SCI, the image rectification circuits 112, 114 can execute image rectification on the luminance information represented by the first bit number LI, and the first color image FCI and the second color image SCI represented by the second bit number respectively to generate rectified luminance information CLI and rectified color images CFCI, CSCI, and the rectified luminance information CLI is represented by the first bit number and the rectified color images CFCI, CSCI are represented by the second bit number. In addition, the image rectification at least includes geometric conversion (e.g. distortion correction, rotation, scaling, planar projection, non-planar projection, and so on). In addition, in another embodiment of the present invention, because operation capability of the image rectification circuit 112 is more powerful, the image rectification circuit 112 can directly execute the image rectification on the luminance information represented by the first bit number LI, and the first color image FCI and the second color image SCI represented by the second bit number respectively to generate the rectified luminance information CLI and the rectified color images CFCI, CSCI, and transmit the rectified color images CFCI, CSCI to the second multiplexer 118 through a transmission line 124, wherein the rectified luminance information CLI is represented by the first bit number and the rectified color images CFCI, CSCI are represented by the second bit number. That is, when the operation capability of the image rectification circuit 112 is more powerful, the image rectification circuit 114 can be neglected. In addition, a purpose of the side-by-side image processor (e.g. the side-by-side image processors 104, 106) provided by the present invention is used for reducing a number of following image processors (e.g. the image processors 108, 110), so the side-by-side image processor provided by the present invention is not necessary. For example, in another embodiment of the present invention, corresponding signal processing paths of the first image FI correspond to the image processor 108, the image rectification circuit 112, and the depth map generator 116; corresponding signal processing paths of the second image SI correspond to the image processor 110, the image rectification circuit 114, and the depth map generator 116, or correspond to the image processor 110, the image rectification circuit 114, and the second multiplexer 118. In addition, each image rectification circuit of the image rectification circuits (e.g. the image rectification circuits 112, 114) provided by the present invention can receive data from all image processors (the image processors 108, 110), meanwhile the corresponding signal processing paths of the second image SI correspond to the image processor 110, the image rectification circuit 112, and the depth map generator 116.

After the image rectification circuit 112 generates the rectified luminance information CLI, or the rectified color images CFCI, CSCI, the depth map generator 116 can generate a depth map DP according to the rectified luminance information CLI or the rectified color images CFCI, CSCI. In addition, before the image system 100 outputs the depth map DP, the image system 100 can optionally utilize a post-processor (not shown in FIG. 2) to execute make-up processing or hole-filling processing on the depth map DP to make quality of the depth map DP better. In addition, as shown in FIG. 2, the rectified color images CFCI, CSCI can be outputted through the second multiplexer 118.

In addition, as shown in FIG. 2, because the first multiplexer 102 is only coupled to the image sensors 1011, 1012, meanwhile the side-by-side image processor 106 and the image processor 110 can be neglected. In addition, the side-by-side image processor 104 can be a field programmable gate array (FPGA) with the above-mentioned functions of the side-by-side image processor 104, or an application-specific integrated circuit (ASIC) with the above-mentioned functions of the side-by-side image processor 104, or a software module with the above-mentioned functions of the side-by-side image processor 104. In addition, the image processor 108 can be a field programmable gate array with the above-mentioned functions of the image processor 108, or an application-specific integrated circuit with the above-mentioned functions of the image processor 108, or a software module with the above-mentioned functions of the image processor 108. In addition, the image rectification circuit 112 can be a field programmable gate array with the above-mentioned functions of the image rectification circuit 112, or an application-specific integrated circuit with the above-mentioned functions of the image rectification circuit 112, or a software module with the above-mentioned functions of the image rectification circuit 112. In addition, the depth map generator 116 can be a field programmable gate array with the above-mentioned functions of the depth map generator 116, or an application-specific integrated circuit with the above-mentioned functions of the depth map generator 116, or a software module with the above-mentioned functions of the depth map generator 116.

Figure 6:
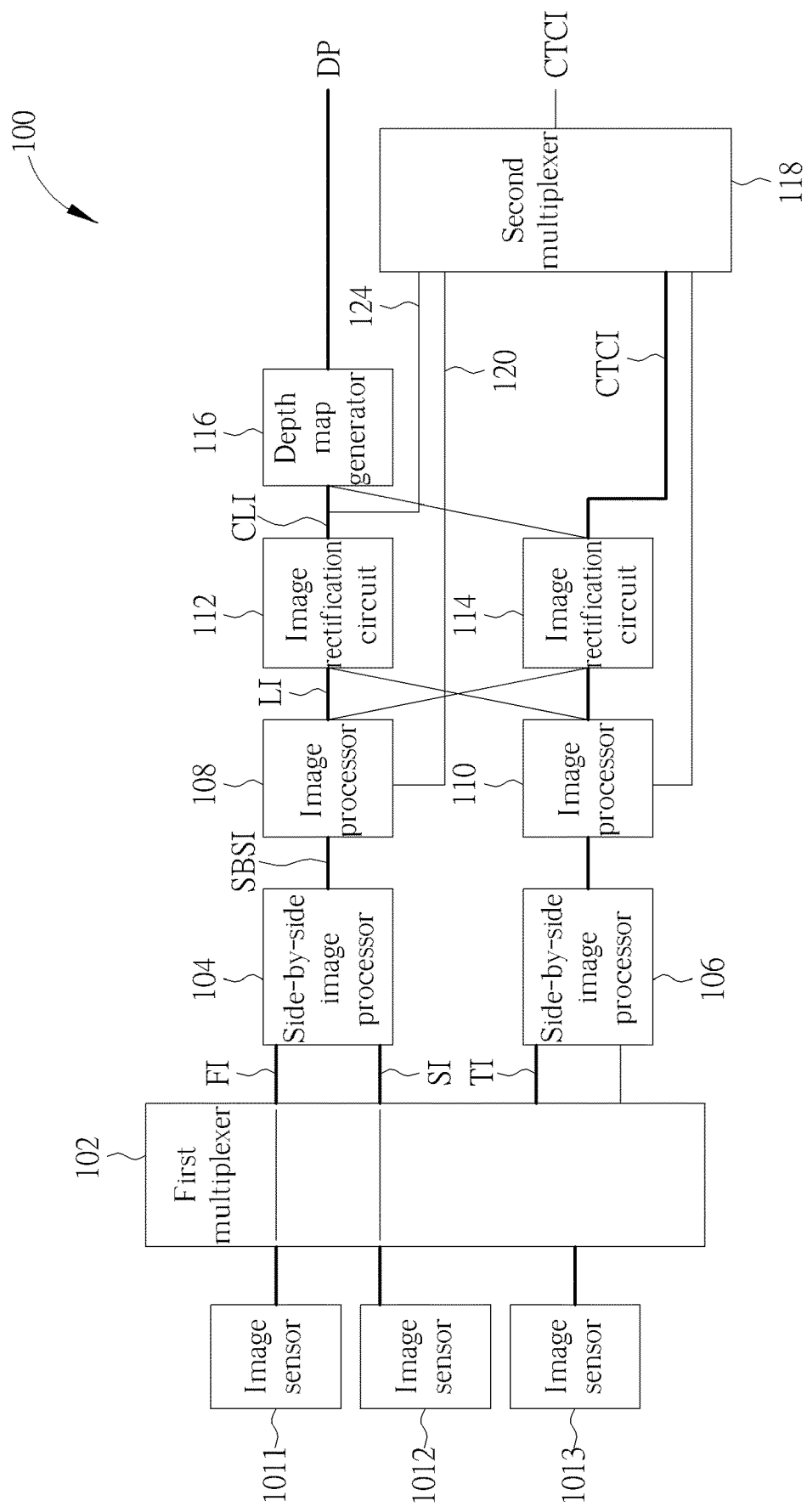
FIG. 6 is a diagram illustrating the first multiplexer of the image system being coupled to the image sensors according to a third embodiment of the present invention.
Figure 7:
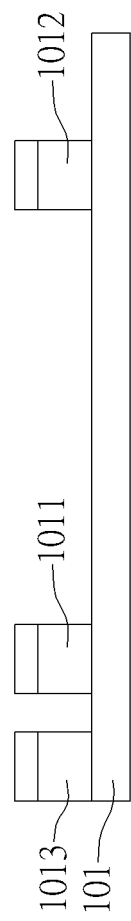
FIG. 7 is a diagram illustrating installation positions of the image sensors on the printed circuit board.

In addition, please refer to FIG. 6. FIG. 6 is a diagram illustrating the first multiplexer 102 of the image system 100 being coupled to the image sensors 1011, 1012, 1013 according to a third embodiment of the present invention, and installation positions of the image sensors 1011, 1012, 1013 on the printed circuit board 101 can be referred to FIG. 7, wherein the first multiplexer 102 is coupled to the image sensors 1011, 1012, 1013 through the printed circuit board 101, the image sensors 1011, 1012 are infrared (IR) image sensors, the image sensor 1013 is an RGB image sensor, and thick black lines shown in FIG. 6 are signal processing paths. As shown in FIG. 6, a principle of the image system 100 utilizing the first image FI and the second image SI generated by the image sensors 1011, 1012, the image processor 108, the image rectification circuit 112, and the depth map generator 116 to generate the depth map DP can be referred to corresponding descriptions of FIG. 2, so further description thereof is omitted for simplicity. In addition, as shown in FIG. 6, a third image TI generated by the image sensor 1013 is also an image represented by the input bit number (e.g. 14 bit), and the image system 100 can turn off the side-by-side image processor 106, and utilize the image processor 110 and the image rectification circuit 114 to process the third image TI to generate a rectified color image CTCI, wherein the rectified color image CTCI is represented by the second bit number. In addition, operation principles of the side-by-side image processor 106, the image processor 110, and the image rectification circuit 114 can be referred to operation principles of the side-by-side image processor 104, the image processor 108, and the image rectification circuit 112, so further description thereof is omitted for simplicity. In addition, as shown in FIG. 6, the rectified color image CTCI can be outputted through the second multiplexer 118.

Figure 8:
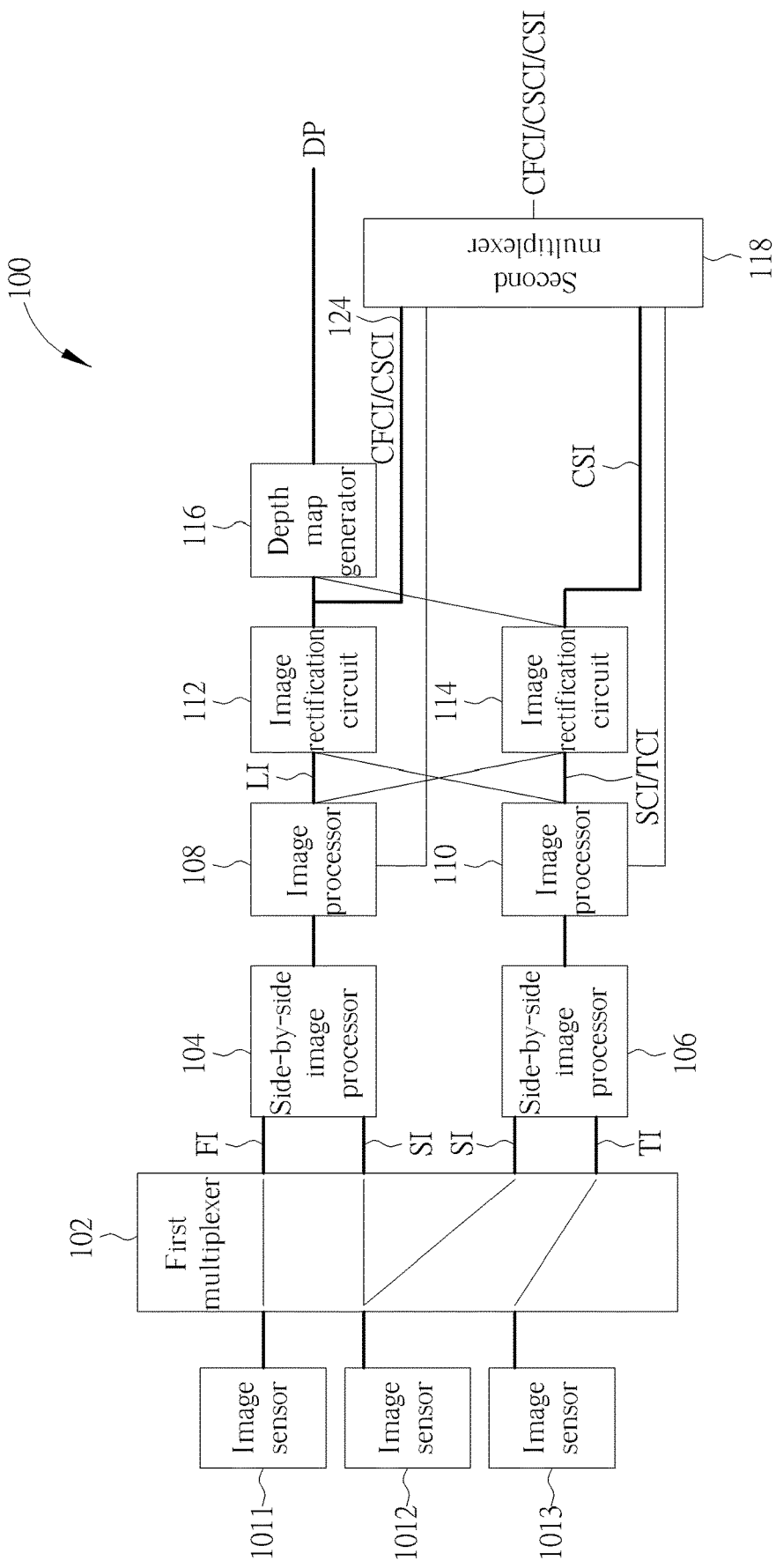
FIG. 8 is a diagram illustrating the first multiplexer of the image system being coupled to the image sensors according to a fourth embodiment of the present invention.
Figure 9:
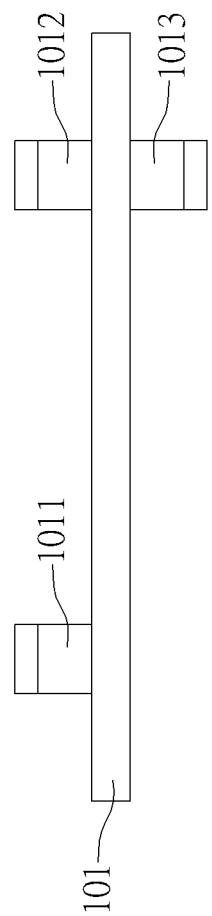
FIG. 9 is a diagram illustrating installation positions of the image sensors on the printed circuit board.

In addition, please refer to FIG. 8. FIG. 8 is a diagram illustrating the first multiplexer 102 of the image system 100 being coupled to the image sensors 1011, 1012, 1013 according to a fourth embodiment of the present invention, and installation positions of the image sensors 1011, 1012, 1013 on the printed circuit board 101 can be referred to FIG. 9, wherein the first multiplexer 102 is coupled to the image sensors 1011, 1012, 1013 through the printed circuit board 101, the image sensors 1012, 1013 are fisheye image sensors, and thick black lines shown in FIG. 8 are signal processing paths. As shown in FIG. 8, the principle of the image system 100 utilizing the first image FI and the second image SI generated by the image sensors 1011, 1012, the image processor 108, the image rectification circuit 112, and the depth map generator 116 to generate the depth map DP can be referred to the corresponding descriptions of FIG. 2, so further description thereof is omitted for simplicity. In addition, as shown in FIG. 8, the second color image SCI (represented by the second bit number) can be generated by the side-by-side image processor 106 and the image processor 110 processing the second image SI generated by the image sensor 1012. In addition, the image system 100 utilizes the side-by-side image processor 106 and the image processor 110 to process the third image TI to generate a third color image TCI, wherein the third color image TCI is represented by the second bit number. As shown in FIG. 8, after the second color image SCI and the third color image TCI are generated, the image rectification circuit 114 can generate a 360 degree color image CSI according to the second color image SCI and the third color image TCI (e.g. when the image rectification circuit 114 stitches the second color image SCI and the third color image TCI, the image rectification circuit 114 can align sutures between the second color image SCI and the third color image TCI to generate the 360 degree color image CSI), wherein the 360 degree color image CSI is represented by the second bit number. In addition, as shown in FIG. 8, the 360 degree color image CSI can be outputted through the second multiplexer 118. In addition, the image rectification circuit 112 can also generate the rectified color images CFCI, CSCI or the rectified luminance information CLI, and the color images CFCI, CSCI and the rectified luminance information CLI are outputted through the transmission line 124 and the second multiplexer 118.

Figure 10:
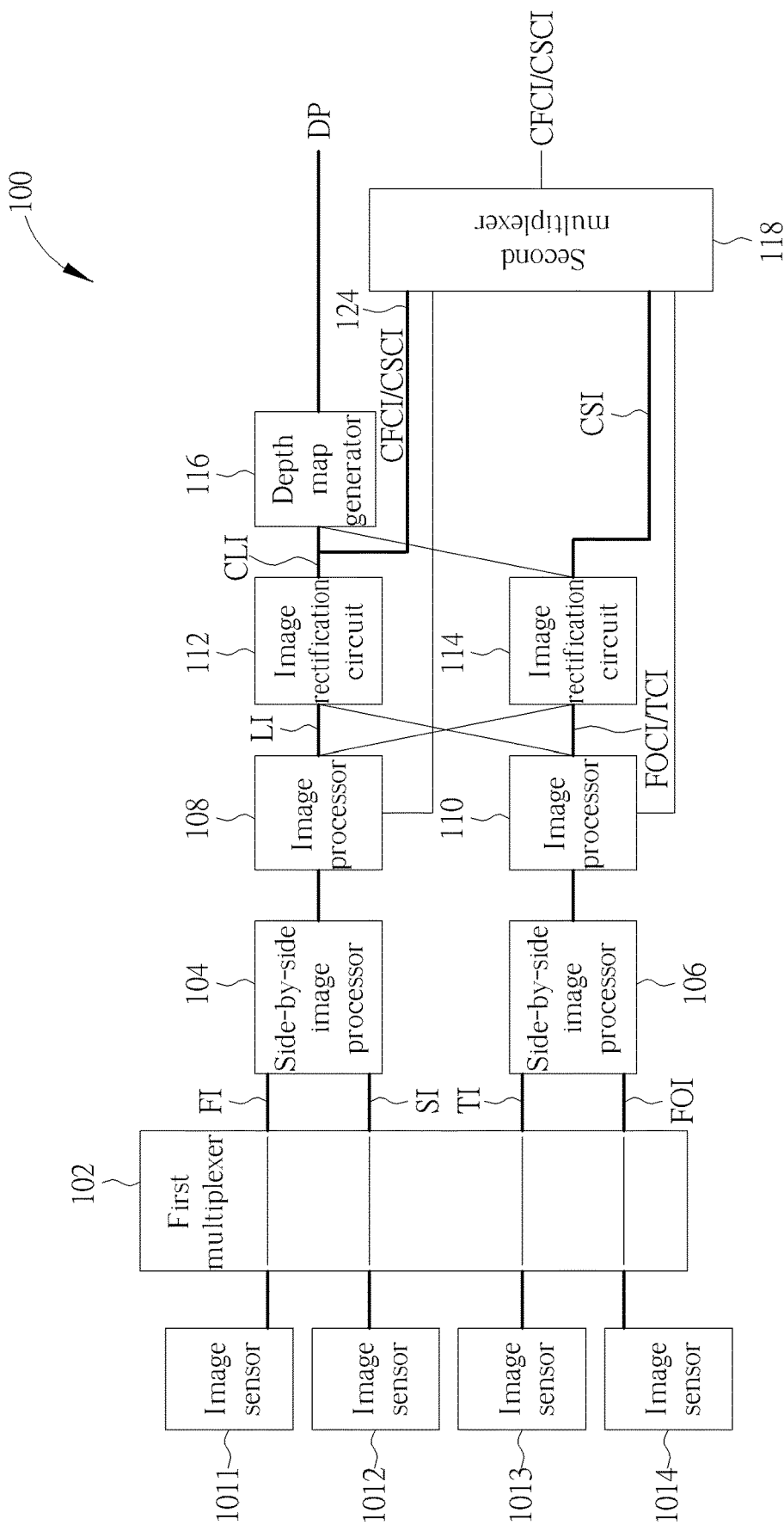
FIG. 10 is a diagram illustrating the first multiplexer of the image system being coupled to the image sensors according to a fifth embodiment of the present invention.
Figure 11:
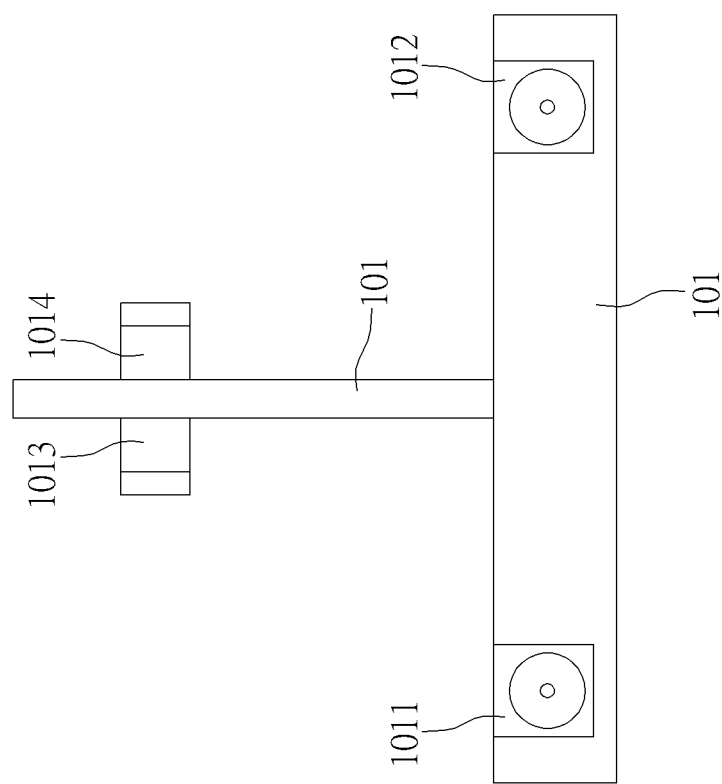
FIG. 11 is a diagram illustrating installation positions of the image sensors on the printed circuit board.

In addition, please refer to FIG. 10. FIG. 10 is a diagram illustrating the first multiplexer 102 of the image system 100 being coupled to the image sensors 1011, 1012, 1013, 1014 according to a fifth embodiment of the present invention, and installation positions of the image sensors 1011, 1012, 1013, 1014 on the printed circuit board 101 can be referred to FIG. 11, wherein the first multiplexer 102 is coupled to the image sensors 1011, 1012, 1013, 1014 through the printed circuit board 101, the image sensors 1013, 1014 are fisheye image sensors, and thick black lines shown in FIG. 10 are signal processing paths. As shown in FIG. 10, the principle of the image system 100 utilizing the first image FI and the second image SI generated by the image sensors 1011, 1012, the image processor 108, the image rectification circuit 112, and the depth map generator 116 to generate the depth map DP can be referred to the corresponding descriptions of FIG. 2, so further description thereof is omitted for simplicity. In addition, the image system 100 utilizes the side-by-side image processor 106 and the image processor 110 to process the third image TI and a fourth image FOI to generate the third color image TCI and a fourth color image FOCI respectively, wherein the third color image TCI and the fourth color image FOCI are represented by the second bit number. As shown in FIG. 10, after the third color image TCI and the fourth color image FOCI are generated, the image rectification circuit 114 can generate the 360 degree color image CSI according to the third color image TCI and the fourth color image FOCI, wherein the 360 degree color image CSI is represented by the second bit number. In addition, as shown in FIG. 10, the 360 degree color image CSI can be outputted through the second multiplexer 118. In addition, the image rectification circuit 112 can also generate the rectified color images CFCI, CSCI or the rectified luminance information CLI, and the color images CFCI, CSCI and the rectified luminance information CLI are outputted through the transmission line 124 and the second multiplexer 118.

Figure 12:
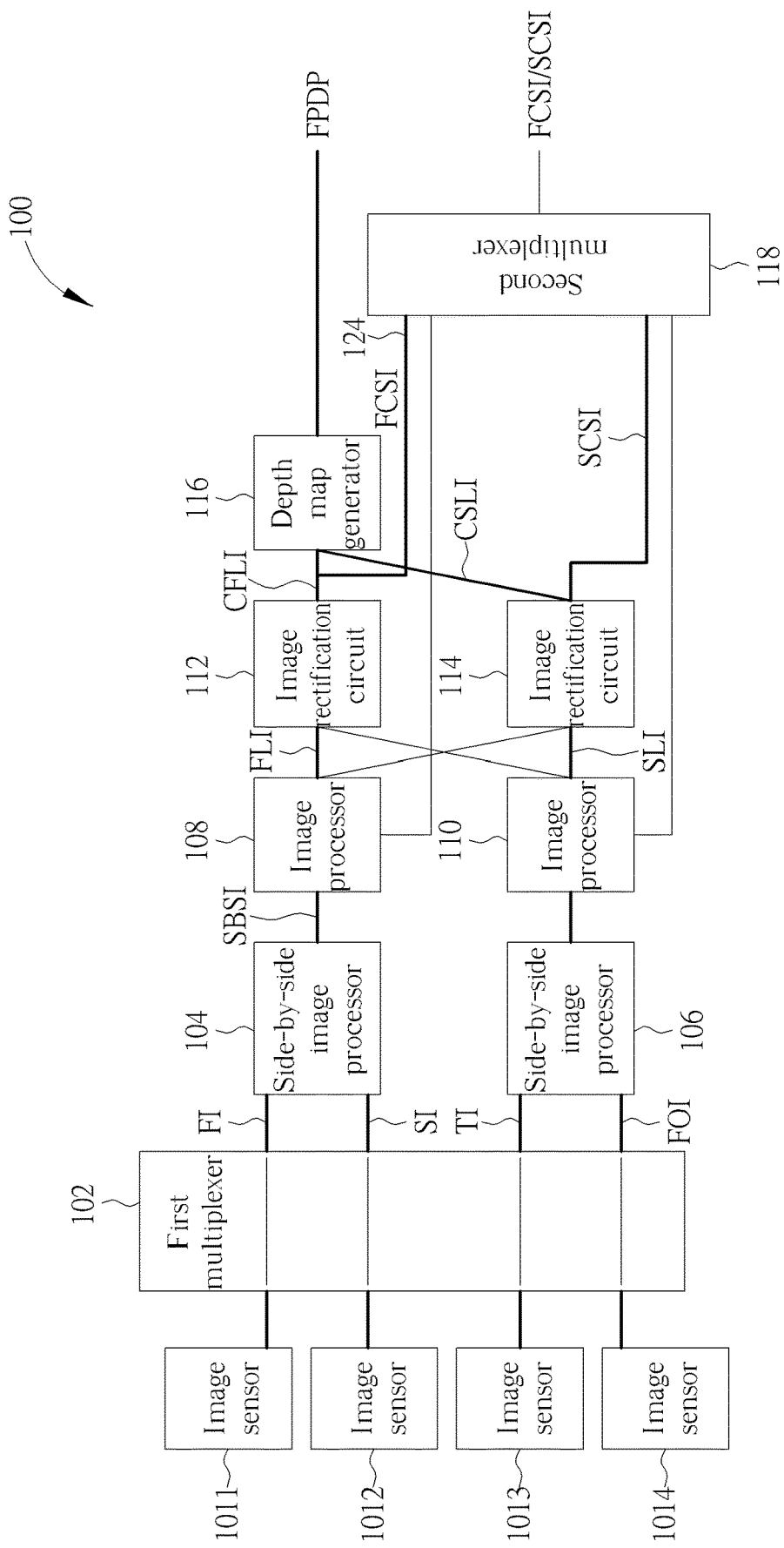
FIG. 12 is a diagram illustrating the first multiplexer of the image system being coupled to the image sensors according to a sixth embodiment of the present invention.
Figure 13:
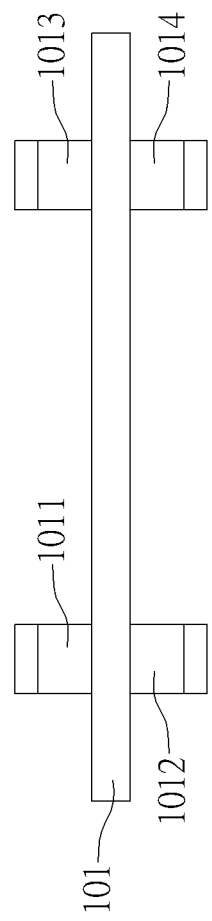
FIG. 13 is a diagram illustrating installation positions of the image sensors on the printed circuit board.

In addition, please refer to FIG. 12. FIG. 12 is a diagram illustrating the first multiplexer 102 of the image system 100 being coupled to the image sensors 1011, 1012, 1013, 1014 according to a sixth embodiment of the present invention, and installation positions of the image sensors 1011, 1012, 1013, 1014 on the printed circuit board 101 can be referred to FIG. 13, wherein the first multiplexer 102 is coupled to the image sensors 1011, 1012, 1013, 1014 through the printed circuit board 101, the image sensors 1011, 1012, 1013, 1014 are fisheye image sensors, and thick black lines shown in FIG. 12 are signal processing paths. As shown in FIG. 12, the image system 100 utilizes the first image FI (hemispherical image) and the second image SI (hemispherical image) generated by the image sensors 1011, 1012 and the image processor 108 to generate a first luminance information FLI represented by the first bit number. After the image processor 108 generates the first luminance information FLI, the image rectification circuit 112 can generate rectified first luminance information CFLI according to the first luminance information FLI, and the rectified first luminance information CFLI is represented by the first bit number. In addition, the image rectification circuit 112 can also generate the rectified color images CFCI, CSCI, and generate a first 360 degree color image FCSI according to the rectified color images CFCI, CSCI, wherein the first 360 degree color image FCSI is outputted through the transmission line 124 and the second multiplexer 118. In addition, as shown in FIG. 12, the image system 100 can also utilize the third image TI (hemispherical image) and the fourth image FOI (hemispherical image) generated by the image sensors 1013, 1014 and the image processor 110 to generate second luminance information SLI represented by the first bit number. After the image processor 110 generates the second luminance information SLI, the image rectification circuit 114 can generate rectified second luminance information CSLI according to the second luminance information SLI, and the rectified second luminance information CSLI is represented by the first bit number. In addition, the image rectification circuit 114 can also generate rectified color images CTCI, CFOCI, and generate a second 360 degree color image SCSI according to the rectified color images CTCI, CFOCI, wherein the second 360 degree color image SCSI can be outputted through the second multiplexer 118. After the image rectification circuit 114 generates the rectified second luminance information CSLI or the second 360 degree color image SCSI, and the image rectification circuit 112 generates the rectified first luminance information CFLI or the first 360 degree color image FCSI, the depth map generator 116 can generate a 360 degree depth map FPDP according to the rectified first luminance information CFLI and the rectified second luminance information CSLI. In addition, in another embodiment of the present invention, the depth map generator 116 generates the 360 degree depth map FPDP according to the first 360 degree color image FCSI and the second 360 degree color image SCSI.

Figure 14:
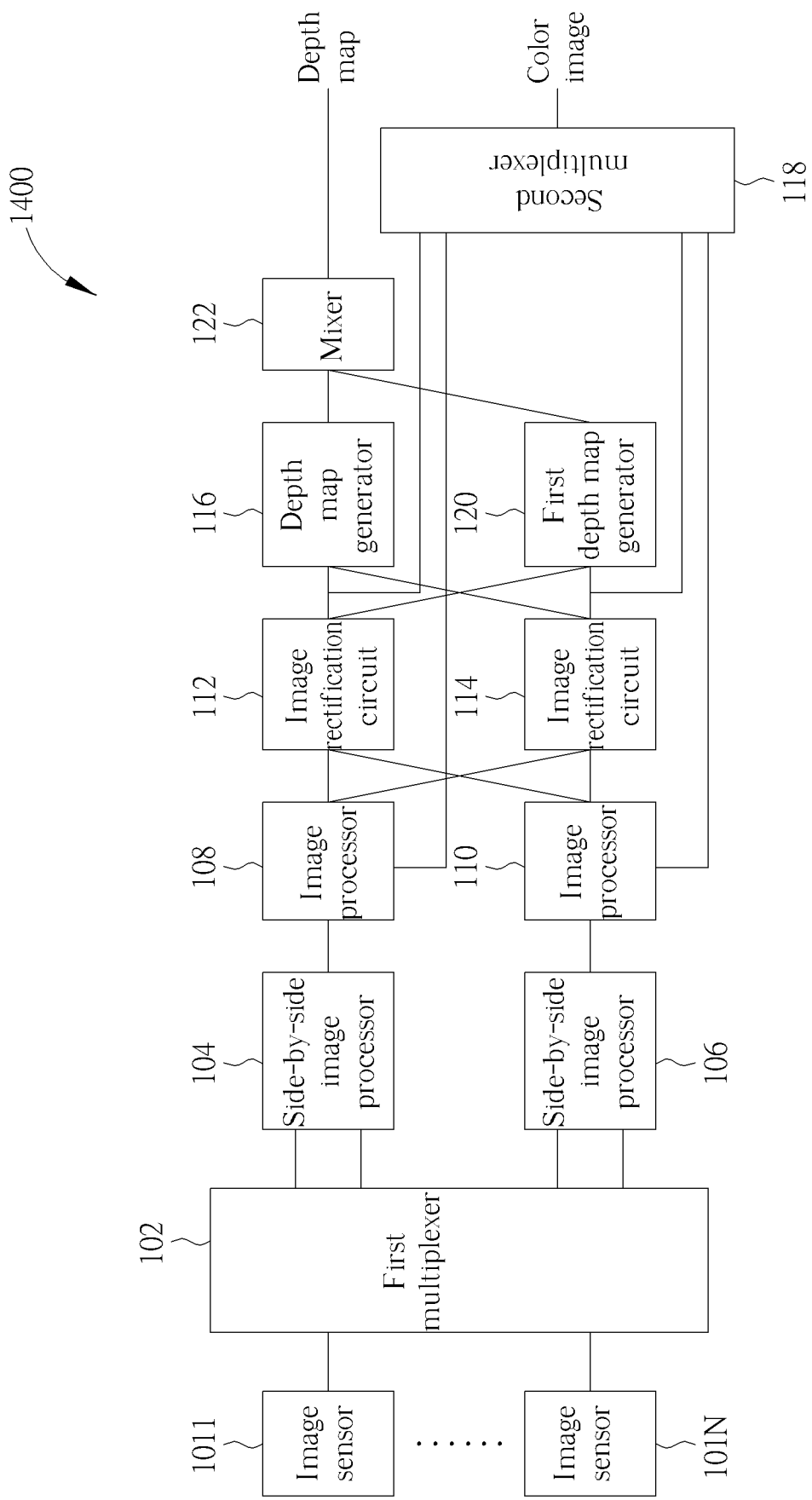
FIG. 14 is a diagram illustrating an image system for generating depth maps and color images according to a seventh embodiment of the present invention.

Please refer to FIG. 14. FIG. 14 is a diagram illustrating an image system 1400 for generating depth maps and color images according to a seventh embodiment of the present invention. As shown in FIG. 14, a difference between the image system 1400 and the image system 100 is that the image system 1400 further includes a first depth map generator 120 and a mixer 122, wherein electrical connection relationships between the plurality of image sensors 1011-101N, the first multiplexer 102, the side-by-side image processors 104, 106, the image processors 108, 110, the image rectification circuits 112, 114, the depth map generator 116, the second multiplexer 118, the first depth map generator 120, and the mixer 122 can be referred to FIG. 14, so further description thereof is omitted for simplicity. In addition, N is an integer not less than 2.

Figure 15:
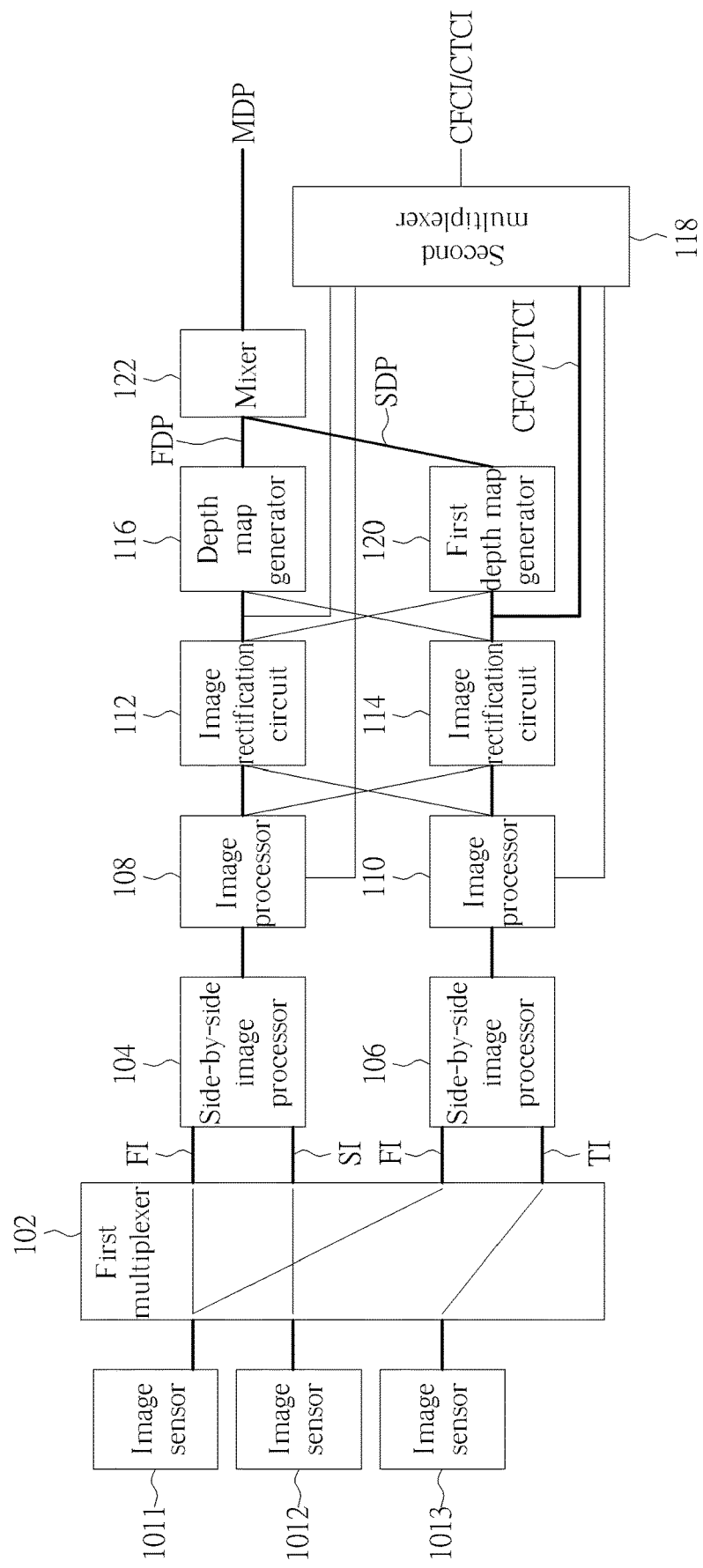
FIG. 15 is a diagram illustrating the first multiplexer of the image system being coupled to the image sensors according to an eighth embodiment of the present invention.

In addition, please refer to FIG. 15. FIG. 15 is a diagram illustrating the first multiplexer 102 of the image system 1400 being coupled to the image sensors 1011, 1012, 1013 according to an eighth embodiment of the present invention, and installation positions of the image sensors 1011, 1012, 1013 on the printed circuit board 101 can be referred to FIG. 16, wherein the first multiplexer 102 is coupled to the image sensors 1011, 1012, 1013 through the printed circuit board 101, and thick black lines shown in FIG. 15 are signal processing paths. As shown in FIG. 15, a principle of the image system 1400 utilizing the first image FI and the second image SI generated by the image sensors 1011, 1012 (a first image capturer pair), the image processor 108, the image rectification circuit 112, and the depth map generator 116 to generate a first depth map FDP can be referred to the corresponding descriptions of FIG. 2, so further description thereof is omitted for simplicity. In addition, a principle of the image system 1400 utilizing the first image FI and the third image TI generated by the image sensors 1011, 1013 (a second image capturer pair), the image processor 110, the image rectification circuit 114, and the first depth map generator 120 to generate a second depth map SDP can also be referred to the corresponding descriptions of FIG. 2, so further description thereof is omitted for simplicity.

Figure 16:
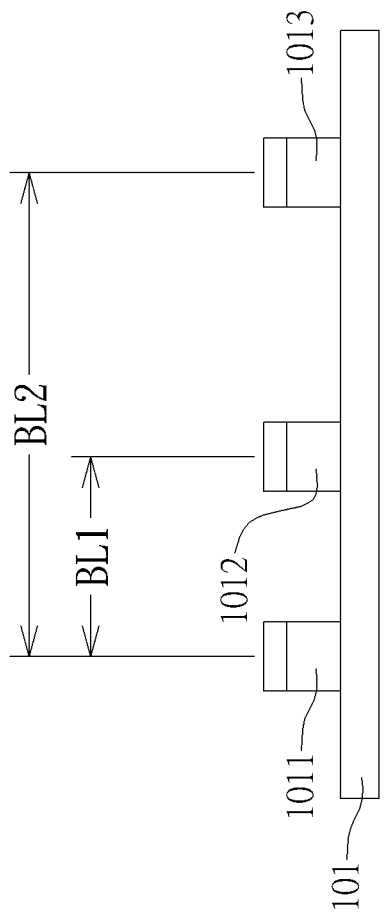
FIG. 16 is a diagram illustrating installation positions of the image sensors on the printed circuit board.
Figure 17:
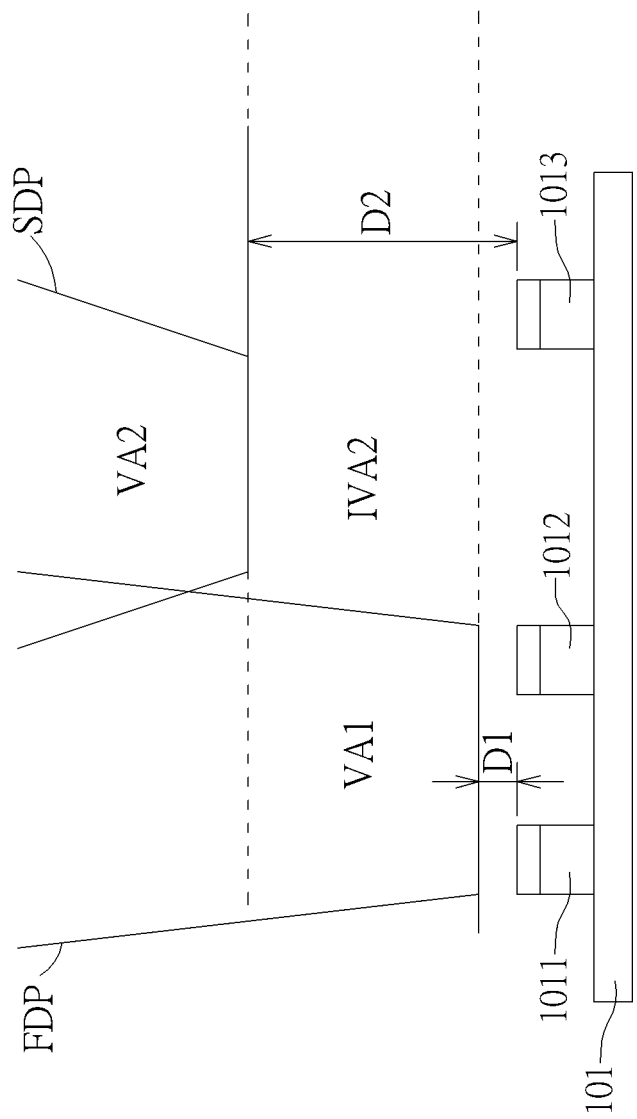
FIG. 17 is a diagram illustrating an invalid area of the second depth map being replaced with a valid area of the first depth map.

As shown in FIG. 16, a length of a first baseline BL1 corresponding to the first image capturer pair is less than a length of a second baseline BL2 corresponding to the second image capturer pair, so accuracy of the first depth map FDP is lower than accuracy of the second depth map SDP, but a valid area of the second depth map SDP is narrower than a valid area of the first depth map FDP. That is, a distance D2 corresponding to a maximum disparity of the second depth map SDP is greater than a distance D1 corresponding to a maximum disparity of the first depth map FDP. After the first depth map FDP and the second depth map SDP are generated, the mixer 122 electrically connected to the depth map generator 116 and the first depth map generator 120 can fuse the first depth map FDP and the second depth map SDP to generate a fused depth map MDP according to a first rule, and execute normalization (e.g. numerical normalization or geometric normalization) or execute image fusion operation, wherein the mixer 122 can be a field programmable gate array with the above-mentioned functions of the mixer 122, or an application-specific integrated circuit with the above-mentioned functions of the mixer 122, or a software module with the above-mentioned functions of the mixer 122. The first rule includes an invalid area IVA2 (corresponding to the distance D2) of the second depth map SDP being replaced with a valid area VA1 of the first depth map FDP (as shown in FIG. 17). In addition, an operational principle and a structure of the first depth map generator 120 are the same as those of the depth map generator 116, so further description thereof is omitted for simplicity. In addition, in regard to the normalization, because the second baseline BL2 is greater than the first baseline BL1, when the first depth map FDP and the second depth map SDP are represented by disparity, the normalization needs to be executed on disparity of the valid area VA1 of the first depth map FDP. That is, the disparity of the valid area VA1 of the first depth map FDP needs to be multiplied by a first normalization ratio to match disparity of the second depth map SDP, wherein the first normalization ratio is determined by equation (1):

$$NRA=BL2/BL1 \qquad (1)$$

As shown in equation (1), NRA is the first normalization ratio, BL1 is the length of the first baseline BL1, and BL2 is the length of the second baseline BL2. Therefore, the fused depth map MDP will include the valid area VA1 of the first depth map FDP and the valid area VA2 of the second depth map SDP, wherein the disparity of the valid area VA1 is a normalized disparity. In addition, because a rectification formula applied to the first depth map FDP may be different from a rectification formula applied to the second depth map SDP, the geometric normalization needs to be executed on the first depth map FDP (or the second depth map SDP) to make geometric positions of the first depth map FDP and geometric positions of the second depth map SDP match each other. In addition, the image rectification circuit 114 outputs the rectified color images CFCI, CTCI corresponding to the geometric normalization, that is, the geometric positions of the second depth map SDP and geometric positions of the rectified color images CFCI, CTCI need to match each other.

Figure 18:
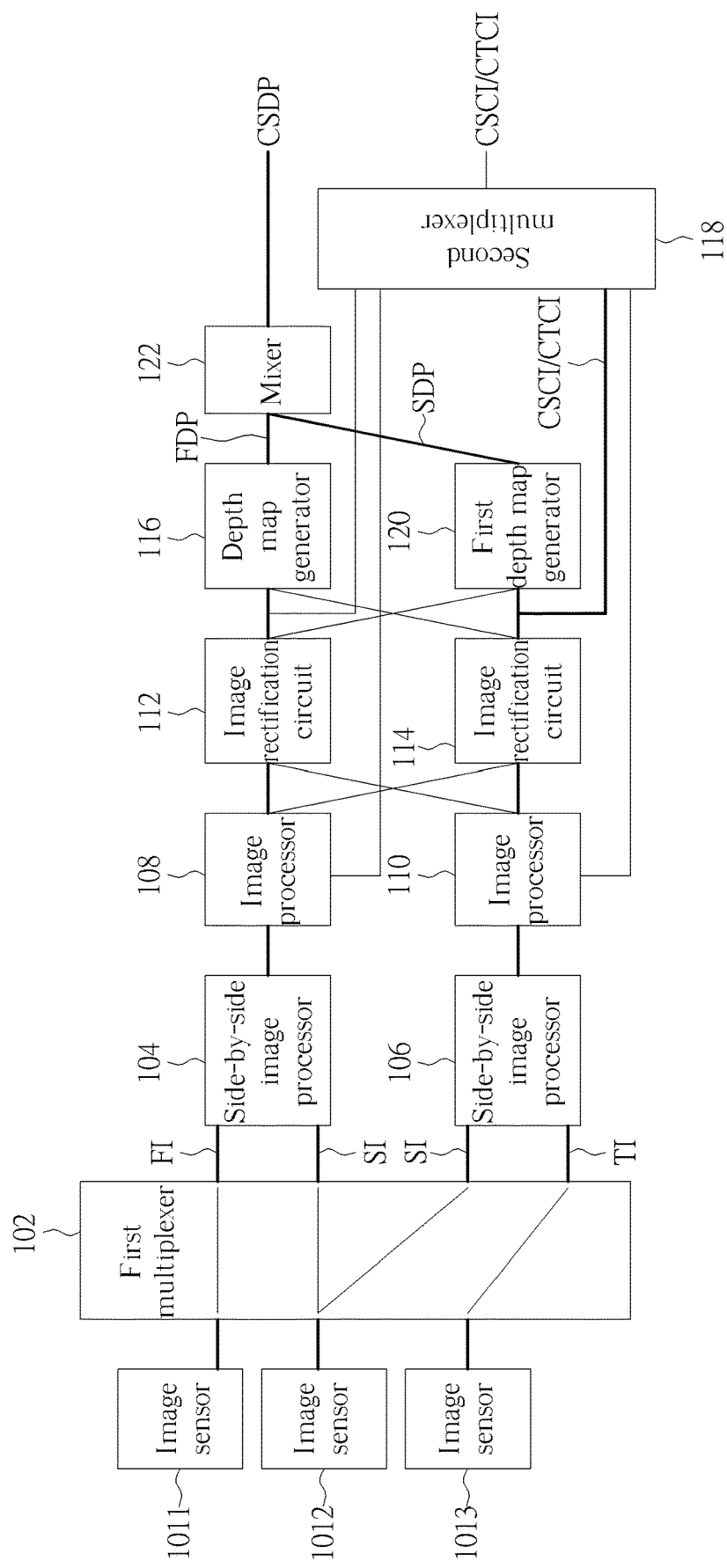
FIG. 18 is a diagram illustrating the first multiplexer of the image system being coupled to the image sensors according to a ninth embodiment of the present invention.
Figure 19:
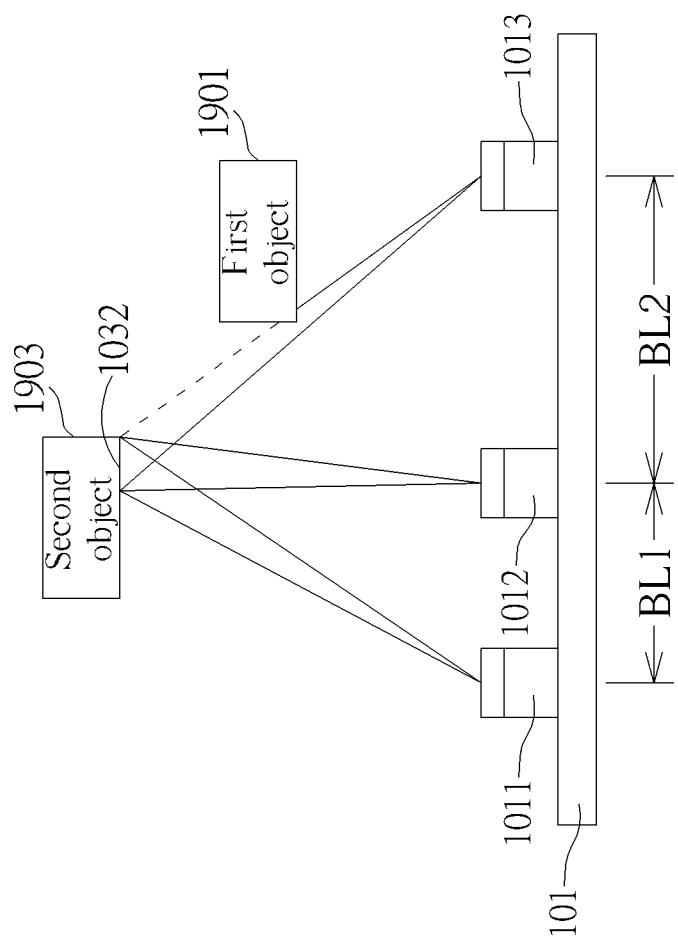
FIG. 19 is a diagram illustrating installation positions of the image sensors on the printed circuit board.

In addition, please refer to FIG. 18. FIG. 18 is a diagram illustrating the first multiplexer 102 of the image system 1400 being coupled to the image sensors 1011, 1012, 1013 according to a ninth embodiment of the present invention, and installation positions of the image sensors 1011, 1012, 1013 on the printed circuit board 101 can be referred to FIG. 19, wherein thick black lines shown in FIG. 18 are signal processing paths. As shown in FIG. 18, the principle of the image system 1400 utilizing the first image FI and the second image SI generated by the image sensors 1011, 1012 (a first image capturer pair), the image processor 108, the image rectification circuit 112, and the depth map generator 116 to generate the first depth map FDP can be referred to the corresponding descriptions of FIG. 2, so further description thereof is omitted for simplicity. In addition, the principle of the image system 1400 utilizing the second image SI and the third image TI generated by the image sensors 1012, 1013 (a second image capturer pair), the image processor 110, the image rectification circuit 114, and the first depth map generator 120 to generate the second depth map SDP can also be referred to the corresponding descriptions of FIG. 2, so further description thereof is omitted for simplicity. As shown in FIG. 19, a first baseline BL1 exists between the image sensors 1011, 1012 and a second baseline BL2 exists between the image sensors 1012, 1013, wherein in one embodiment of the present invention, a length of the first baseline BL1 is equal to a length of the second baseline BL2.

Figure 20:
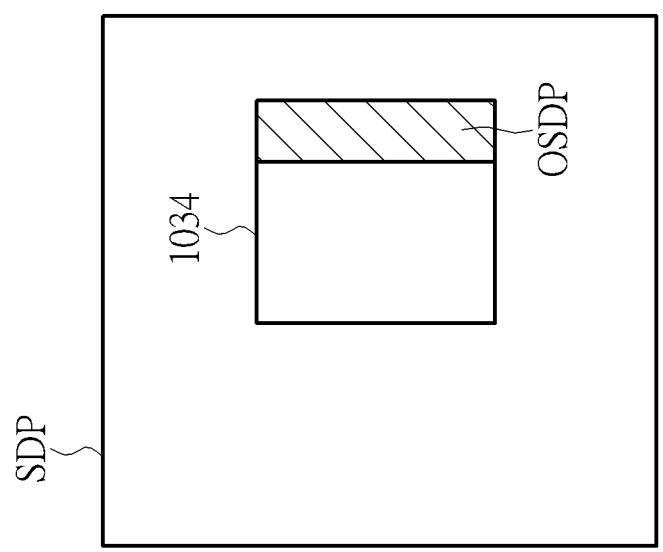
FIG. 20 is a diagram illustrating an occlusion region appearing at a right side of a region of the second depth map corresponding to the second object.
Figure 21:
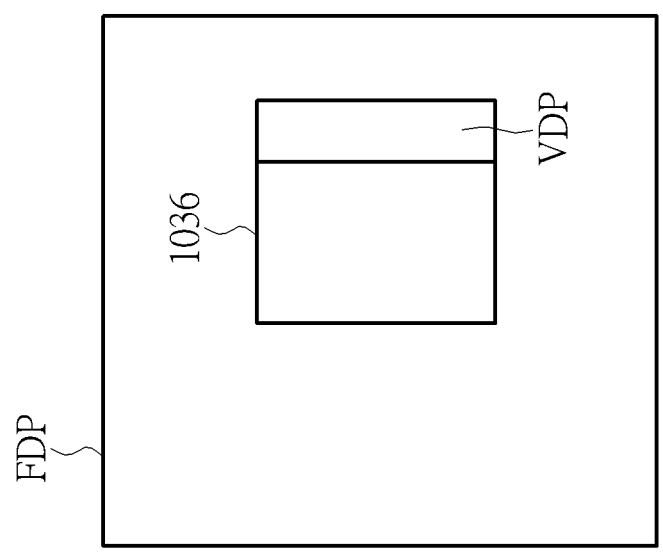
FIG. 21 is a diagram illustrating the first depth map having a region corresponding to the second object.

As shown in FIG. 19, when a first object 1901 exists between the image sensors 1011, 1012, 1013 and a second object 1903, the image sensor 1013 will not sense a region 1032 of the second object 1903 because a visual field of the image sensor 1013 corresponding to the second object 1903 is occluded by the first object 1901, resulting in an occlusion region OSDP (as shown in FIG. 20) appearing at a right side of a region 1034 (corresponding to the second object 1903) of the second depth map SDP generated by the first depth map generator 120 according to images captured by the second image capturer pair including the second object 1903. As shown in FIG. 19, taking the image sensor 1012 being installed on a left of the image sensor 1013 and the image sensor 1012 being installed on a right of the image sensor 1011 as an example, a search direction of the first depth map generator 120 within images captured by the image sensor 1013 is toward left based on images captured by the image sensor 1012. The occlusion region OSDP of the second depth map SDP is just an invalid area of the second depth map SDP. In addition, the depth map generator 116 can also generate the first depth map FDP corresponding to the first image capturer pair according to images captured by the first image capturer pair including the second object 1903, wherein the first depth map FDP has a region 1036 (as shown in FIG. 21) corresponding to the second object 1903, and a search direction of the depth map generator 116 within images captured by the image sensor 1011 is toward right based on the images captured by the image sensor 1012. As shown in FIG. 19, although the first object 1901 exists between the image system 1400 and the second object 1903, because visual fields of the image sensors 1011, 1012 corresponding to the second object 1903 are not occluded by the first object 1901, both the image sensors 1011, 1012 can sense the region 1032 of the second object 1903. Therefore, a search direction of the depth map generator 116 within images (including the second object 1903) captured by the image sensor 1011 is toward right based on the images (including the second object 1903) captured by the image sensor 1012 to generate the first depth map FDP, so a region VDP (as shown in FIG. 21) of the first depth map FDP corresponding to the occlusion region OSDP of the second depth map SDP is a valid area. Therefore, the mixer 122 can utilize depth information of the region VDP of the first depth map FDP corresponding to the occlusion region OSDP of the second depth map SDP to correct (e.g. substitute for) the occlusion region OSDP of the second depth map SDP, and then output a corrected depth map CSDP corresponding to the second depth map SDP. In addition, because the length of the first baseline BL1 is equal to the length of the second baseline BL2, the mixer 122 can directly utilize the depth information of the region VDP of the first depth map FDP to substitute for the occlusion region OSDP of the second depth map SDP. That is, when the mixer 122 utilizes the depth information of the region VDP of the first depth map FDP to substitute for the occlusion region OSDP of the second depth map SDP, no numerical normalization needs to be executed on a disparity of the region VDP to make the disparity of the region VDP match a disparity of the second depth map SDP. However, in another embodiment of the present invention, if the length of the first baseline BL1 is not equal to the length of the second baseline BL2, when the mixer 122 utilizes the depth information of the region VDP of the first depth map FDP to substitute for the occlusion region OSDP of the second depth map SDP, the normalization needs to be executed on the disparity of the region VDP. In addition, because a rectification formula applied to the first depth map FDP may be different from a rectification formula applied to the second depth map SDP, the geometric normalization needs to be executed on the first depth map FDP (or the second depth map SDP) to make the geometric positions of the first depth map FDP and the geometric positions of the second depth map SDP match each other. In addition, the image rectification circuit 114 outputs the rectified color images CSCI, CTCI corresponding to the geometric normalization.

Figure 22:
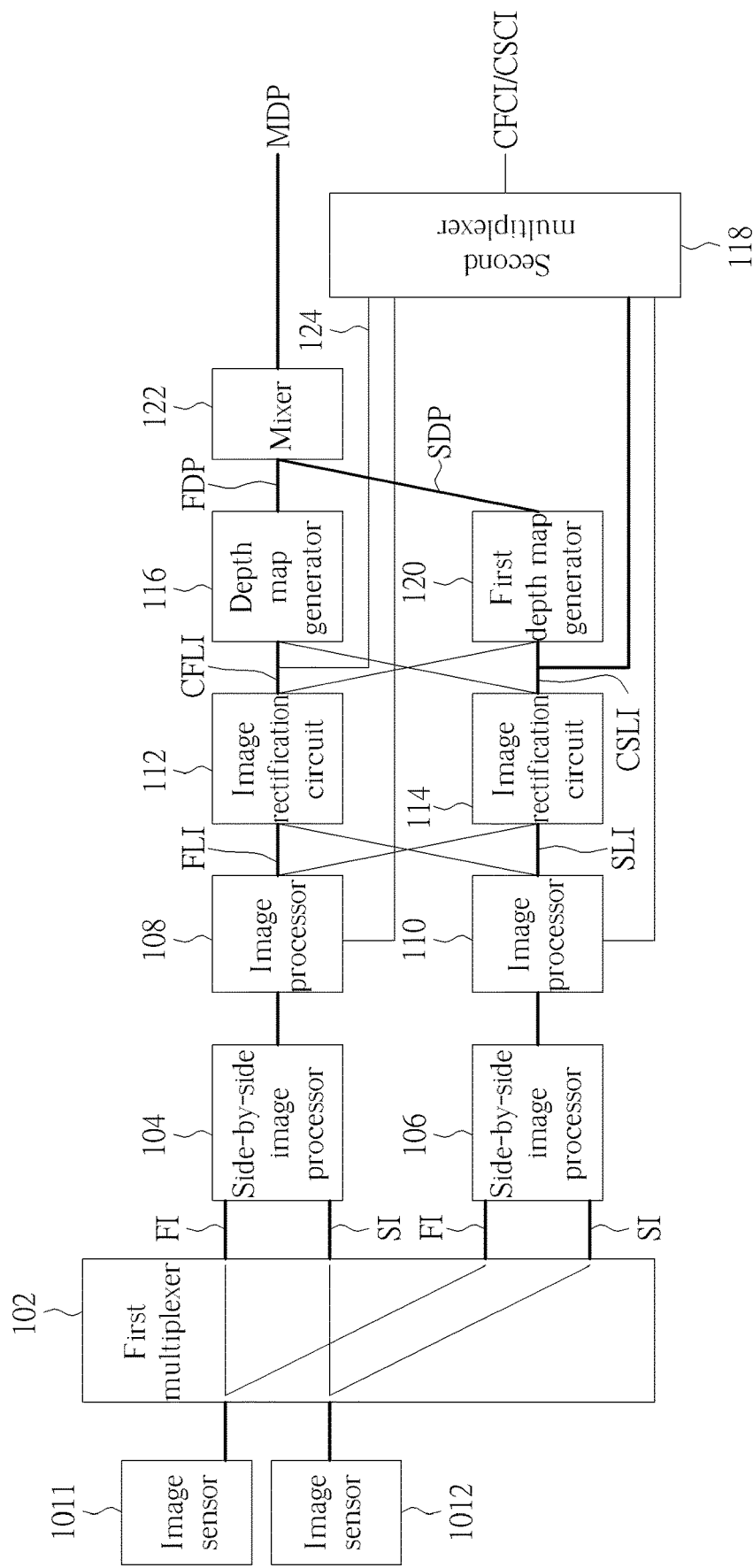
FIG. 22 is a diagram illustrating the first multiplexer of the image system being coupled to the image sensors according to a tenth embodiment of the present invention.

In addition, please refer to FIG. 22. FIG. 22 is a diagram illustrating the first multiplexer 102 of the image system 1400 being coupled to the image sensors 1011, 1012 according to a tenth embodiment of the present invention, wherein thick black lines shown in FIG. 22 are signal processing paths. As shown in FIG. 22, the principle of the image system 1400 utilizing the first image FI and the second image SI generated by the image sensors 1011, 1012, the image processor 108, the image rectification circuit 112, and the depth map generator 116 to generate the first depth map FDP can be referred to the corresponding descriptions of FIG. 2, so further description thereof is omitted for simplicity. In addition, as shown in FIG. 22, after the image processor 110 generates the second luminance information SLI according to the first image FI and the second image SI, the image rectification circuit 114 can scale (magnify, shrink) the second luminance information SLI to generate the rectified second luminance information CSLI based on a resolution of the first luminance information FLI, wherein the image rectification circuit 114 can horizontally scale (or vertically scale) the second luminance information SLI. In addition, in another embodiment of the present invention, the image rectification circuit 114 can scale the first color image FCI and the second color image SCI to generate the rectified color images CFCI, CSCI. In another embodiment of the present invention, the above-mentioned scale operation can also be completed directly by the image processor 108. However, in one embodiment of the present invention, the first depth map generator 120 can generate a temporary second depth map according to the rectified second luminance information CSLI, wherein a resolution of the rectified second luminance information CSLI is different from a resolution of the rectified first luminance information CFLI. After the first depth map generator 120 generates the temporary second depth map, the first depth map generator 120 can scale the temporary second depth map to generate the second depth map SDP. If a horizontal resolution of the rectified second luminance information CSLI is higher than a horizontal resolution of the rectified first luminance information CFLI, a second horizontal resolution of the second depth map SDP is higher than a first horizontal resolution of the first depth map FDP. That is, accuracy of the first depth map FDP is lower than accuracy of the second depth map SDP, but the valid area of the first depth map FDP is greater than the valid area of the second depth map SDP. After the first depth map FDP and the second depth map SDP are generated, the mixer 122 electrically connected to the depth map generator 116 and the first depth map generator 120 can fuse the first depth map FDP and the second depth map SDP to generate the fused depth map MDP according to the first rule, wherein the first rule includes the invalid area IVA2 (corresponding to the distance D2) of the second depth map SDP being replaced with the valid area VA1 of the first depth map FDP (can be referred to FIG. 17), and before the mixer 122 fuses the first depth map FDP and the second depth map SDP, the mixer 122 needs to execute geometric normalization on at least one of the first depth map FDP and the second depth map SDP because the second horizontal resolution of the second depth map SDP is different from the first horizontal resolution of the first depth map FDP. In addition, the first rule can be referred to corresponding descriptions of FIGS. 15-17, so further description thereof is omitted for simplicity. Similarly, when the first depth map FDP and the second depth map SDP are represented by disparity, the normalization needs to be executed on the disparity of the valid area VA1 of the first depth map FDP. That is, the disparity of the valid area VA1 of the first depth map FDP needs to be multiplied by a normalization ratio to match the disparity of the second depth map SDP, wherein the normalization ratio is determined by the resolution of the first luminance information FLI and the resolution of the second luminance information SLI, or resolution of the first rectified color images CFCI and the second rectified color images CSCI.

Figure 23:
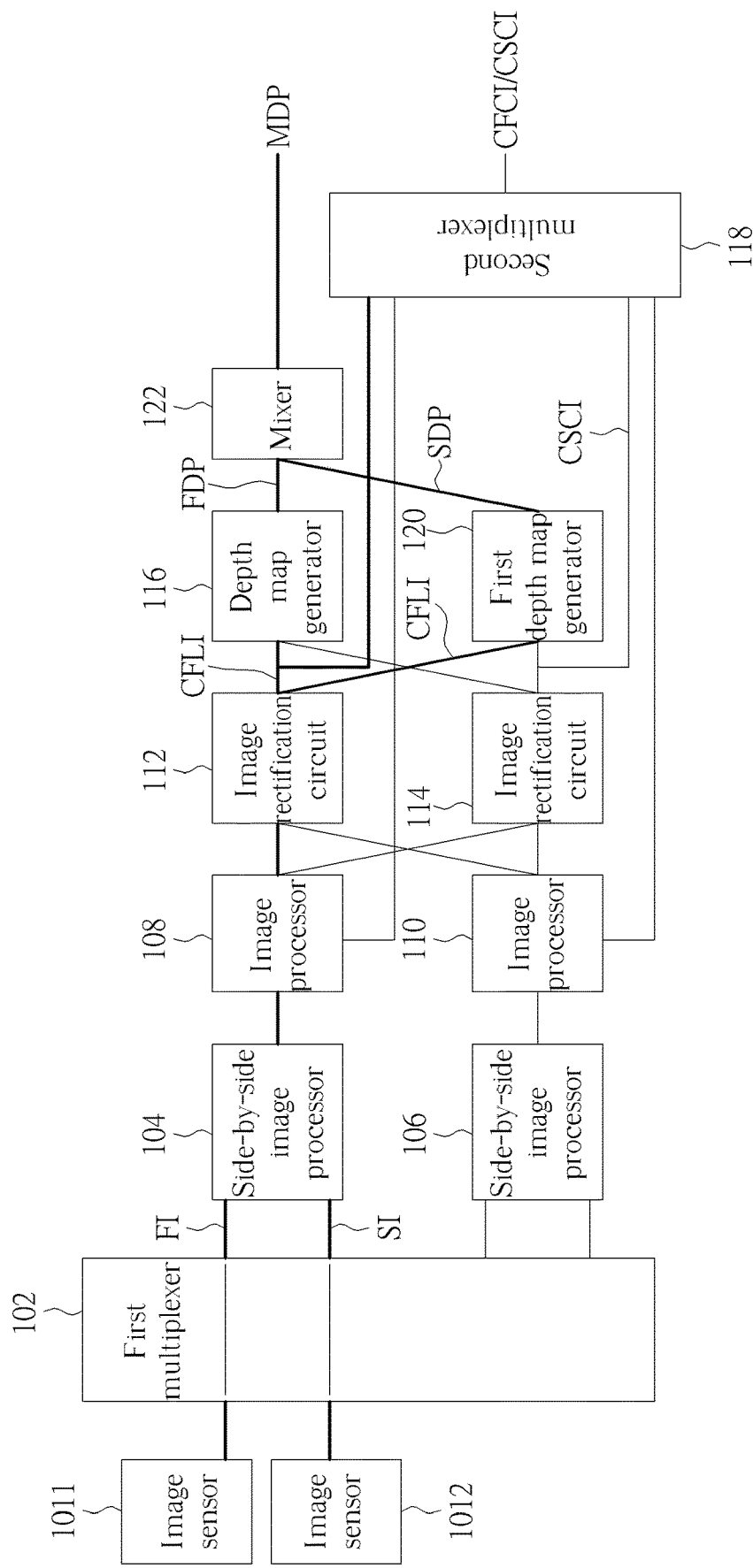
FIG. 23 is a diagram illustrating the first multiplexer of the image system being coupled to the image sensors according to an eleventh embodiment of the present invention.

In addition, please refer to FIG. 23. FIG. 23 is a diagram illustrating the first multiplexer 102 of the image system 1400 being coupled to the image sensors 1011, 1012 according to an eleventh embodiment of the present invention, wherein thick black lines shown in FIG. 23 are signal processing paths. As shown in FIG. 23, the principle of the image system 1400 utilizing the first image FI and the second image SI generated by the image sensors 1011, 1012, the image processor 108, and the image rectification circuit 112 to generate the first luminance information FLI (or the first color image FCI and the second color image SCI) can be referred to the corresponding descriptions of FIG. 2, so further description thereof is omitted for simplicity. In addition, as shown in FIG. 23, the first depth map generator 120 can further change block matching resolutions (that is, block matching sampling frequencies) to generate the second depth map SDP with different characteristic, wherein in one embodiment of the present invention, a first block matching sampling frequency corresponding to the rectified first luminance information CFLI is less than a second block matching sampling frequency corresponding to second luminance information of the second depth map SDP. Therefore, the depth map generator 116 can execute block matching on the rectified first luminance information CFLI to generate the first depth map FDP corresponding to the first block matching sampling frequency according to the first block matching sampling frequency, and the first depth map generator 120 can execute the block matching on the second luminance information to generate the second depth map SDP corresponding to the second block matching sampling frequency according to the second block matching sampling frequency. Because the first block matching sampling frequency is less than the second block matching sampling frequency, the resolution of the first depth map FDP corresponding to the first block matching sampling frequency is less than the resolution of the second depth map SDP corresponding to the second block matching sampling frequency, wherein an effective range of the first depth map FDP corresponding to the first block matching sampling frequency and an effective range of the second depth map SDP corresponding to the second block matching sampling frequency can be referred to FIG. 17. In addition, the mixer 122 can fuse the first depth map FDP corresponding to the first block matching sampling frequency and the second depth map SDP corresponding to the second block matching sampling frequency to generate the fused depth map MDP according to the first rule. For example, the first rule includes the invalid area IVA2 of the second depth map SDP being replaced with the valid area VA1 of the first depth map FDP. In addition, when the first depth map FDP corresponding to the first block matching sampling frequency and the second depth map SDP corresponding to the second block matching sampling frequency are represented by disparity, the disparity of the valid area VA1 of the first depth map FDP needs to be multiplied by a second normalization ratio to match the disparity of the second depth map SDP corresponding to the second block matching sampling frequency, wherein the second normalization ratio is determined by equation (2):

$$SNRA = SSR/FSR \quad (2)$$

As shown in equation (2), SNRA is the second normalization ratio, FSR is the first block matching sampling frequency, and SSR is the second block matching sampling frequency.

Figure 24:
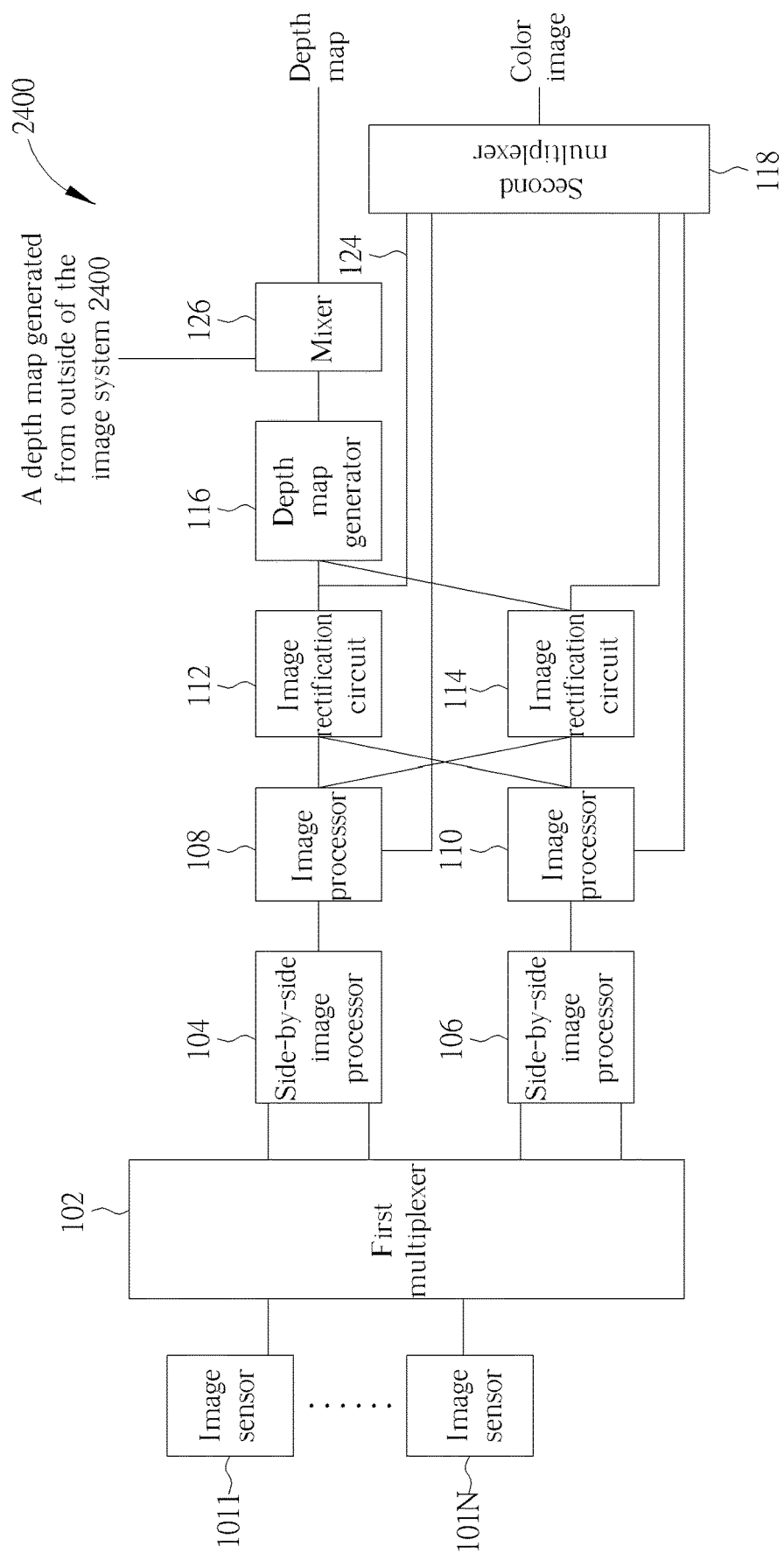
FIG. 24 is a diagram illustrating an image system for generating depth maps and color images according to a twelfth embodiment of the present invention.

Please refer to FIG. 24. FIG. 24 is a diagram illustrating an image system 2400 for generating depth maps and color images according to a twelfth embodiment of the present invention. As shown in FIG. 24, a difference between the image system 2400 and the image system 100 is that the image system 2400 further includes a mixer 126, wherein electrical connection relationships between the plurality of image sensors 1011-101N, the first multiplexer 102, the side-by-side image processors 104, 106, the image processors 108, 110, the image rectification circuits 112, 114, the depth map generator 116, the second multiplexer 118, and the mixer 126 can be referred to FIG. 24, so further description thereof is omitted for simplicity. In addition, N is an integer not less than 2.

Please refer to FIG. 25. FIG. 25 is a diagram illustrating relationships between the image sensors 1011, 1012, 1013 and a first function block 2502 of the image system 2400 and a first function block 2504 according to a thirteenth embodiment of the present invention, wherein as shown in FIG. 25, the first multiplexer 102, the side-by-side image processors 104, 106, the image processors 108, 110, the image rectification circuits 112, 114, the depth map generator 116, the second multiplexer 118, and the mixer 126 of the image system 2400 are included in the first function block 2502 for simplicity, so the first function block 2502 has functions of the first multiplexer 102, the side-by-side image processors 104, 106, the image processors 108, 110, the image rectification circuits 112, 114, the depth map generator 116, the second multiplexer 118, and the mixer 126. In addition, as shown in FIG. 25, the first function block 2504 has all corresponding functions of the first function block 2502, and is located outside the image system 2400. In addition, a principle of the first function block 2502 utilizing the first image FI and the second image SI generated by the image sensors 1011, 1012 to generate the first depth map FDP can be referred to the corresponding descriptions of FIG. 2, so further description thereof is omitted for simplicity. In addition, a principle of the first function block 2504 utilizing the first image FI and the third image TI generated by the image sensors 1011, 1013 to generate the second depth map SDP can also be referred to the corresponding descriptions of FIG. 2, so further description thereof is omitted for simplicity, and the first function block 2504 transmits the second depth map SDP to the first function block 2502. Therefore, after the first function block 2502 generates the first depth map FDP and receives the second depth map SDP, the mixer 126 of the first function block 2502 can fuse the first depth map FDP and the second depth map SDP to generate the fused depth map MDP. In addition, in another embodiment of the present invention, the first function block 2504 receives the first image FI generated by the image sensor 1011 through the first function block 2502 (as shown in FIG. 26). In addition, operational principles and a structure of the mixer 126 are the same as those of the mixer 122, so further description thereof is omitted for simplicity.

Figure 27:
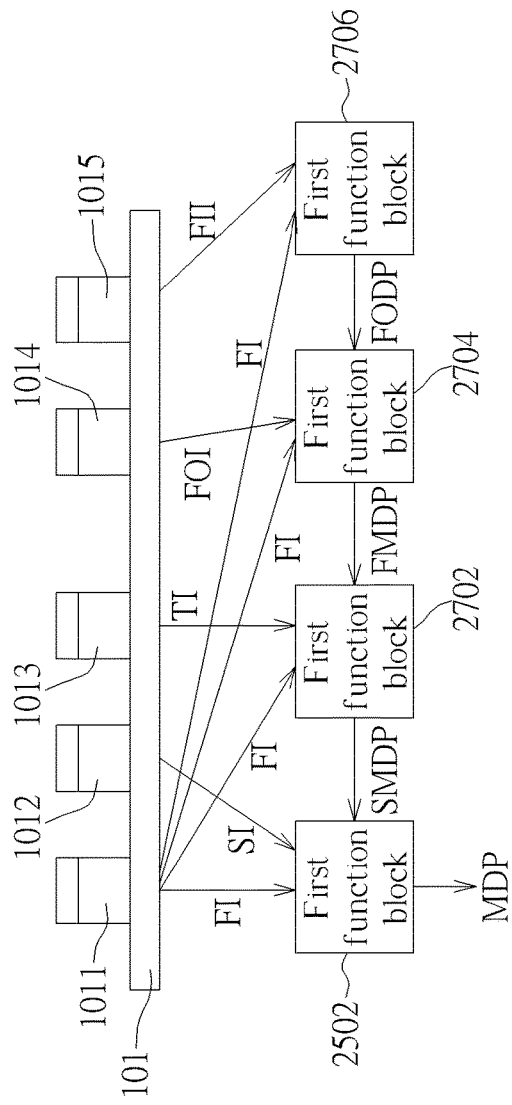
FIG. 27 is a diagram illustrating relationships between image sensors and the first function block of the image system and first function blocks according to a fourteenth embodiment of the present invention.
Figure 28:
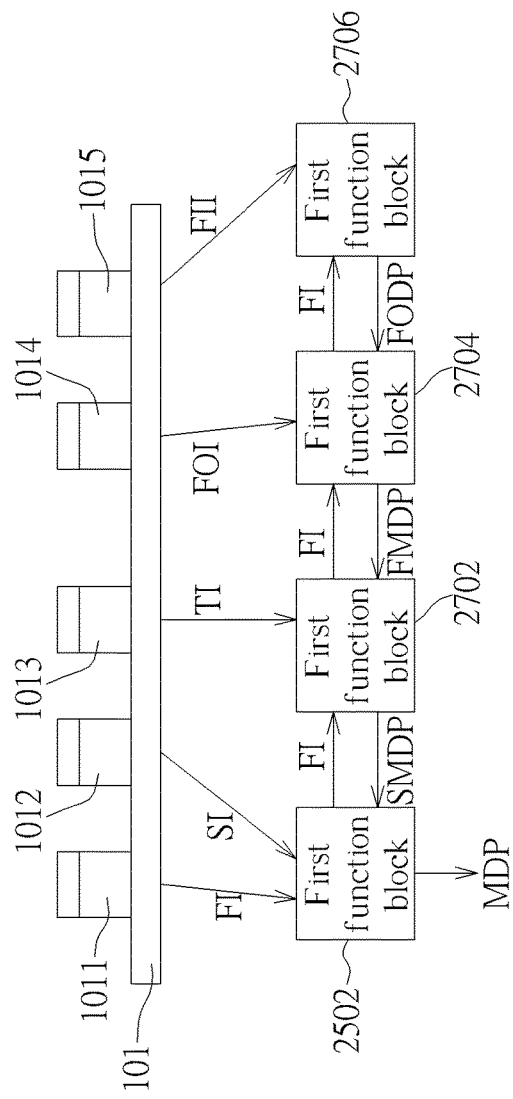
FIG. 28 is a diagram illustrating relationships between the image sensors and a first function block of the image system and a first function block according to another embodiment of the present invention.

Please refer to FIG. 27. FIG. 27 is a diagram illustrating relationships between image sensors 1011-1015 and the first function block 2502 of the image system 2400 and first function blocks 2702-2706 according to a fourteenth embodiment of the present invention. As shown in FIG. 27, each of the first function blocks 2702-2706 has the all corresponding functions of the first function block 2502, and is located outside the image system 2400. A principle of the first function block 2702 utilizing the first image FI and the third image TI generated by the image sensors 1011, 1013 to generate the second depth map SDP, a principle of the first function block 2704 utilizing the first image FI and the fourth image FOI generated by the image sensors 1011, 1014 to generate a third depth map TDP, and a principle of the first function block 2706 utilizing the first image FI and a fifth image FII generated by the image sensors 1011, 1015 to generate a fourth depth map FODP can be referred to the corresponding descriptions of FIG. 2, so further description thereof is omitted for simplicity. In addition, the fourth depth map FODP is transmitted to the first function block 2704, and then the first function block 2704 fuses the fourth depth map FODP and the third depth map TDP to generate a first fused depth map FMDP; the first fused depth map FMDP is transmitted to the first function block 2702, and then the first function block 2702 fuses the first fused depth map FMDP and the second depth map SDP to generate a second fused depth map SMDP; and the second fused depth map SMDP is transmitted to the first function block 2502, and then the first function block 2502 fuses the second fused depth map SMDP and the first depth map FDP to generate the fused depth map MDP. In addition, in another embodiment of the present invention, the first function blocks 2702-2706 receive the first image FI generated by the image sensor 1011 through the function block 2502 (as shown in FIG. 28).

Figure 29:
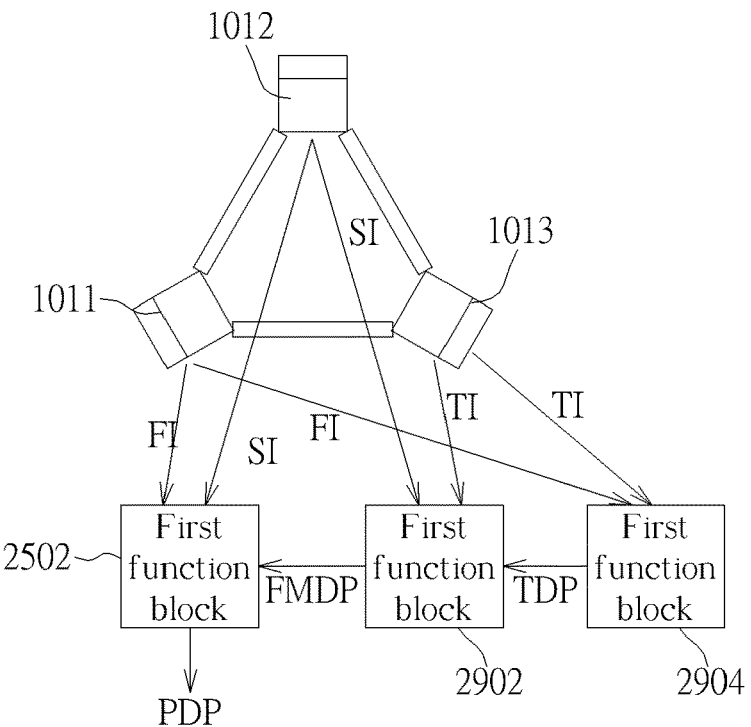
FIG. 29 is a diagram illustrating relationships between the image sensors and the first function block of the image system and first function blocks according to a fifteenth embodiment of the present invention.

Please refer to FIG. 29. FIG. 29 is a diagram illustrating relationships between the image sensors 1011-1013 and the first function block 2502 of the image system 2400 and first function blocks 2902, 2904 according to a fifteenth embodiment of the present invention. As shown in FIG. 29, each of the first function blocks 2902, 2904 has the all corresponding functions of the first function block 2502, and is located outside the image system 2400. A principle of the first function block 2902 utilizing the second image SI and the third image TI generated by the image sensors 1012, 1013 to generate the second depth map SDP, and a principle of the first function block 2904 utilizing the first image FI and the third image TI generated by the image sensors 1011, 1013 to generate the third depth map TDP can be referred to the corresponding descriptions of FIG. 2, so further description thereof is omitted for simplicity. In addition, the third depth map TDP is transmitted to the first function block 2902, and then the first function block 2902 fuses the third depth map TDP and the second depth map SDP to generate the first fused depth map FMDP; and the first fused depth map FMDP is transmitted to the first function block 2502, and then the first function block 2502 fuses the first fused depth map FMDP and the first depth map FDP to generate a 360 degree depth map PDP.

Figure 30:
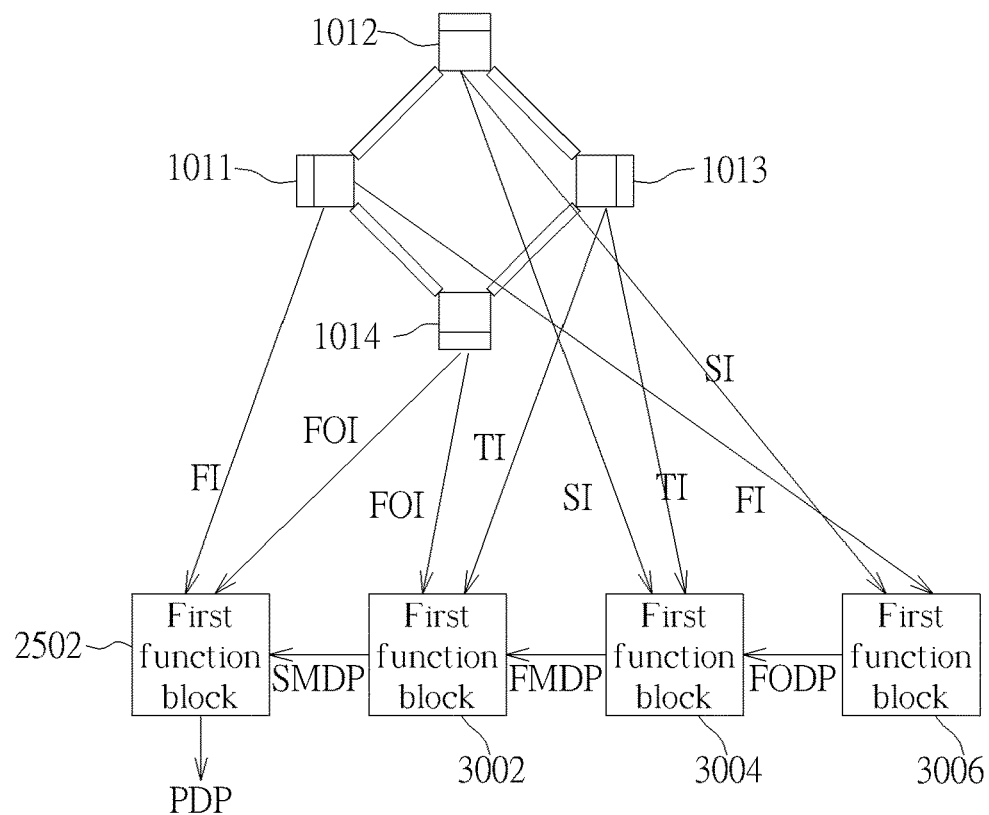
FIG. 30 is a diagram illustrating relationships between the image sensors and the first function block of the image system and first function blocks according to a sixteenth embodiment of the present invention.

Please refer to FIG. 30. FIG. 30 is a diagram illustrating relationships between the image sensors 1011-1014 and the first function block 2502 of the image system 2400 and first function blocks 3002-3006 according to a sixteenth embodiment of the present invention. As shown in FIG. 30, each of the first function blocks 3002-3006 has the all corresponding functions of the first function block 2502, and is located outside the image system 2400. A principle of the first function block 3002 utilizing the fourth image FOI and the third image TI generated by the image sensors 1014, 1013 to generate the second depth map SDP, a principle of the first function block 3004 utilizing the second image SI and the third image TI generated by the image sensors 1012, 1013 to generate the third depth map TDP, and a principle of the first function block 3006 utilizing the first image FI and the second image SI generated by the image sensors 1011, 1012 to generate the fourth depth map FODP can be referred to the corresponding descriptions of FIG. 2, so further description thereof is omitted for simplicity. In addition, the fourth depth map FODP is transmitted to the first function block 3004, and then the first function block 3004 fuses the fourth depth map FODP and the third depth map TDP to generate the first fused depth map FMDP; the first fused depth map FMDP is transmitted to the first function block 3002, and then the first function block 3002 fuses first fused depth map FMDP and the second depth map SDP to generate the second fused depth map SMDP; and the second fused depth map SMDP is transmitted to the first function block 2502, and then the first function block 2502 fuses the second fused depth map SMDP and the first depth map FDP to generate the 360 degree depth map PDP.

Figure 31:
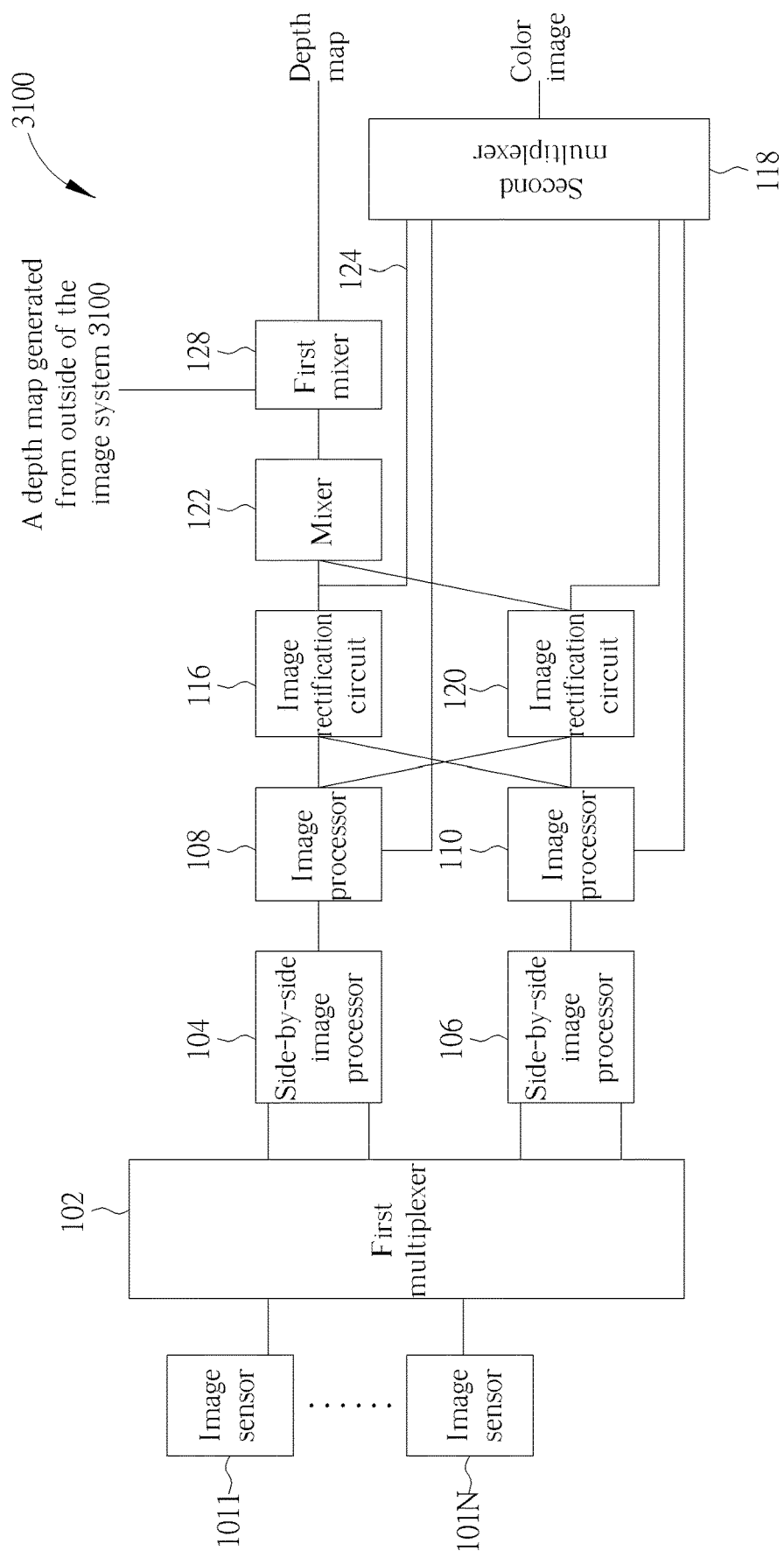
FIG. 31 is a diagram illustrating an image system for generating depth maps and color images according to a seventeenth embodiment of the present invention.

Please refer to FIG. 31. FIG. 31 is a diagram illustrating an image system 3100 for generating depth maps and color images according to a seventeenth embodiment of the present invention. As shown in FIG. 31, a difference between the image system 3100 and the image system 1400 is that the image system 3100 further includes a first mixer 128, wherein electrical connection relationships between the plurality of image sensors 1011-101N, the first multiplexer 102, the side-by-side image processors 104, 106, the image processors 108, 110, the image rectification circuits 112, 114, the depth map generator 116, the second multiplexer 118, the first depth map generator 120, the mixer 122, and the first mixer 128 can be referred to FIG. 31, so further description thereof is omitted for simplicity. In addition, N is an integer not less than 2.

Figure 32:
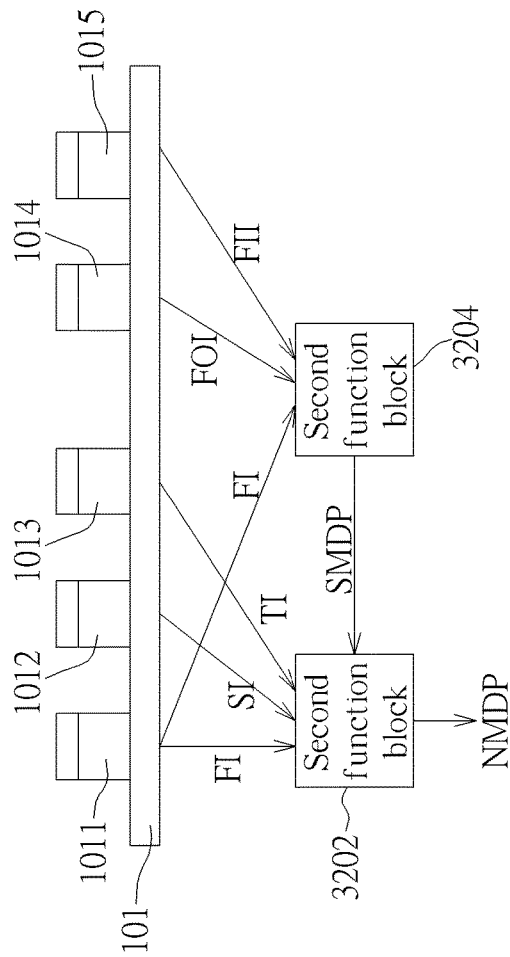
FIG. 32 is a diagram illustrating relationships between image sensors and a second function block of the image system and a second function block according to an eighteenth embodiment of the present invention.
Figure 33:
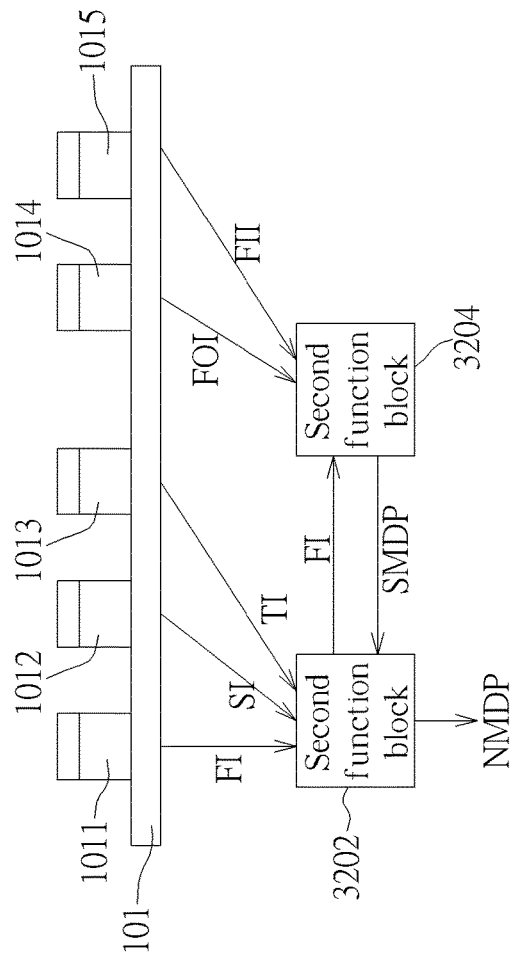
FIG. 33 is a diagram illustrating relationships between image sensors and a second function block of the image system and a second function block according to another embodiment of the present invention.

Please refer to FIG. 32. FIG. 32 is a diagram illustrating relationships between image sensors 1011, 1012, 1013, 1014, 1015 and a second function block 3202 of the image system 3100 and a second function block 3204 according to an eighteenth embodiment of the present invention, wherein as shown in FIG. 32, the first multiplexer 102, the side-by-side image processors 104, 106, the image processors 108, 110, the image rectification circuits 112, 114, the depth map generator 116, the second multiplexer 118, the first depth map generator 120, the mixer 122, and the first mixer 128 of the image system 3100 are included in the second function block 3202 for simplicity, so the second function block 3202 has functions of the first multiplexer 102, the side-by-side image processors 104, 106, the image processors 108, 110, the image rectification circuits 112, 114, the depth map generator 116, the second multiplexer 118, the first depth map generator 120, the mixer 122, and the first mixer 128. In addition, as shown in FIG. 32, the second function block 3204 has all corresponding functions of the second function block 3202, and is located outside the image system 3100. In addition, a principle of the second function block 3202 fusing the first depth map FDP (corresponding to the first image FI and the second image SI) and the second depth map SDP (corresponding to the first image FI and the third image TI) to generate the first fused depth map FMDP can be referred to the above-mentioned corresponding descriptions, so further description thereof is omitted for simplicity. In addition, a principle of the second function block 3204 fusing the third depth map TDP (corresponding to the first image FI and the fourth image FOI) and the fourth depth map FODP (corresponding to the first image FI and the fifth image FII) to generate the second fused depth map SMDP can also be referred to the above-mentioned corresponding descriptions, so further description thereof is omitted for simplicity. In addition, the second function block 3204 transmits the second fused depth map SMDP to the second function block 3202. Therefore, after the second function block 3202 generates the first fused depth map FMDP and receives the second fused depth map SMDP, the second function block 3202 can fuse the first fused depth map FMDP and the second fused depth map SMDP to generate a new fused depth map NMDP. In addition, in another embodiment of the present invention, the second function block 3204 receives the first image FI generated by the image sensor 1011 through the second function block 3202 (as shown in FIG. 33). In addition, operational principles and a structure of the first mixer 128 are the same as those of the mixer 122, so further description thereof is omitted for simplicity.

Figure 34:
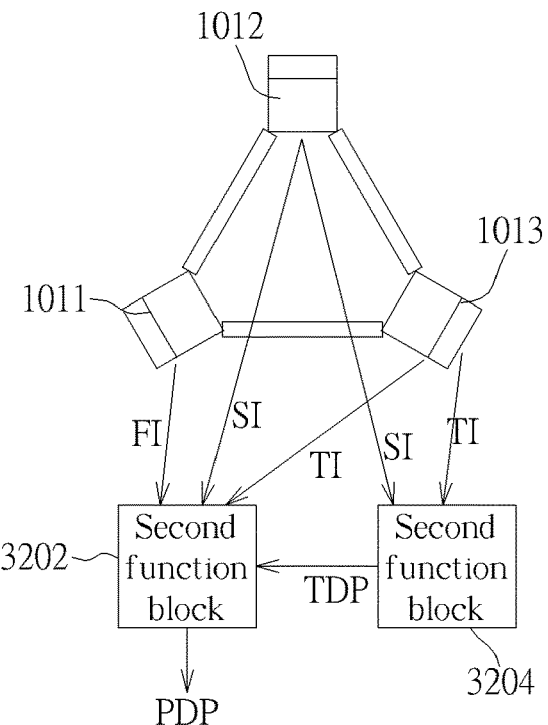
FIG. 34 is a diagram illustrating relationships between the image sensors and the second function block of the image system and the second function block according to a nineteenth embodiment of the present invention.

Please refer to FIG. 34. FIG. 34 is a diagram illustrating relationships between the image sensors 1011-1013 and the second function block 3202 of the image system 3100 and the second function block 3204 according to a nineteenth embodiment of the present invention. As shown in FIG. 34, the second function block 3202 utilizes the first image FI and the second image SI generated by the image sensors 1011, 1012 to generate the first depth map FDP and the first image FI and the third image TI generated by the image sensors 1011, 1013 to generate the second depth map SDP, and the second function block 3204 utilizes the second image SI and the third image TI generated by the image sensors 1012, 1013 to generate the third depth map TDP. In addition, the third depth map TDP is transmitted to the second function block 3202 by the second function block 3204. Therefore, after the second function block 3202 generates the first depth map FDP and the second depth map SDP and receives the third depth map TDP, the second function block 3202 can generate the 360 degree depth map PDP according to the first depth map FDP, the second depth map SDP, and the third depth map TDP.

Figure 35:
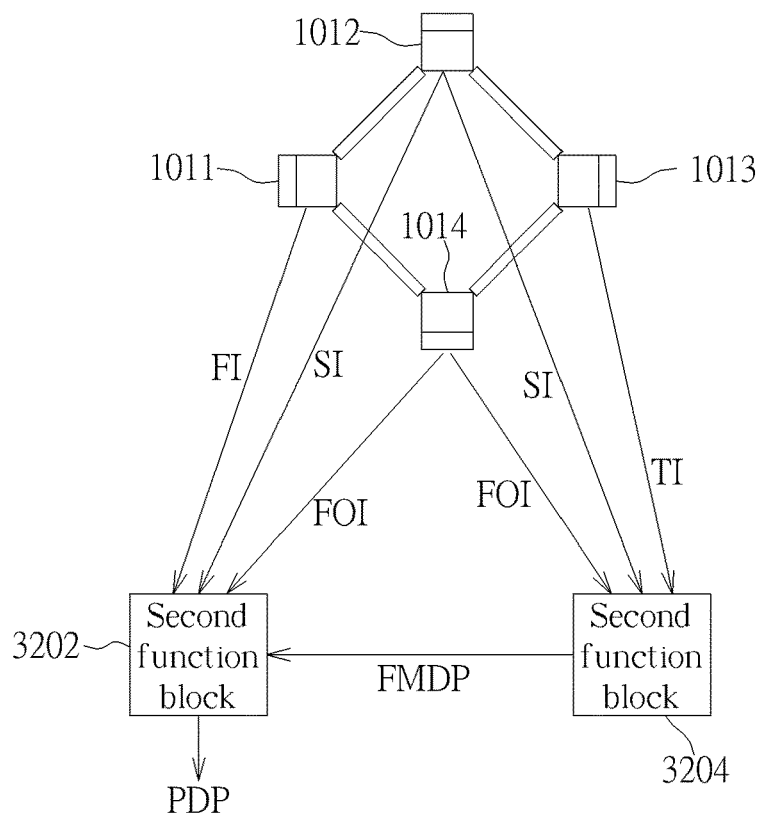
FIG. 35 is a diagram illustrating relationships between the image sensors and the second function block of the image system and the second function block according to a twentieth embodiment of the present invention.

Please refer to FIG. 35. FIG. 35 is a diagram illustrating relationships between the image sensors 1011-1014 and the second function block 3202 of the image system 3100 and the second function block 3204 according to a twentieth embodiment of the present invention. As shown in FIG. 35, the second function block 3202 utilizes the first image FI and the second image SI generated by the image sensors 1011, 1012 to generate the first depth map FDP and the first image FI and the fourth image FOI generated by the image sensors 1011, 1014 to generate the second depth map SDP, and the second function block 3204 utilizes the second image SI and the third image TI generated by the image sensors 1012, 1013 to generate the third depth map TDP and the third image TI and the fourth image FOI generated by the image sensors 1013, 1014 to generate the fourth depth map FODP. In addition, the third depth map TDP and the fourth depth map FODP are merged to generate the first merged depth map FMDP, and the first merged depth map FMDP is transmitted to the second function block 3202 by the second function block 3204. Therefore, after the second function block 3202 generates the first depth map FDP and the second depth map SDP and receives the first merged depth map FMDP, the second function block 3202 can generate the 360 degree depth map PDP according to the first depth map FDP, the second depth map SDP, and the first merged depth map FMDP.

Figure 36:
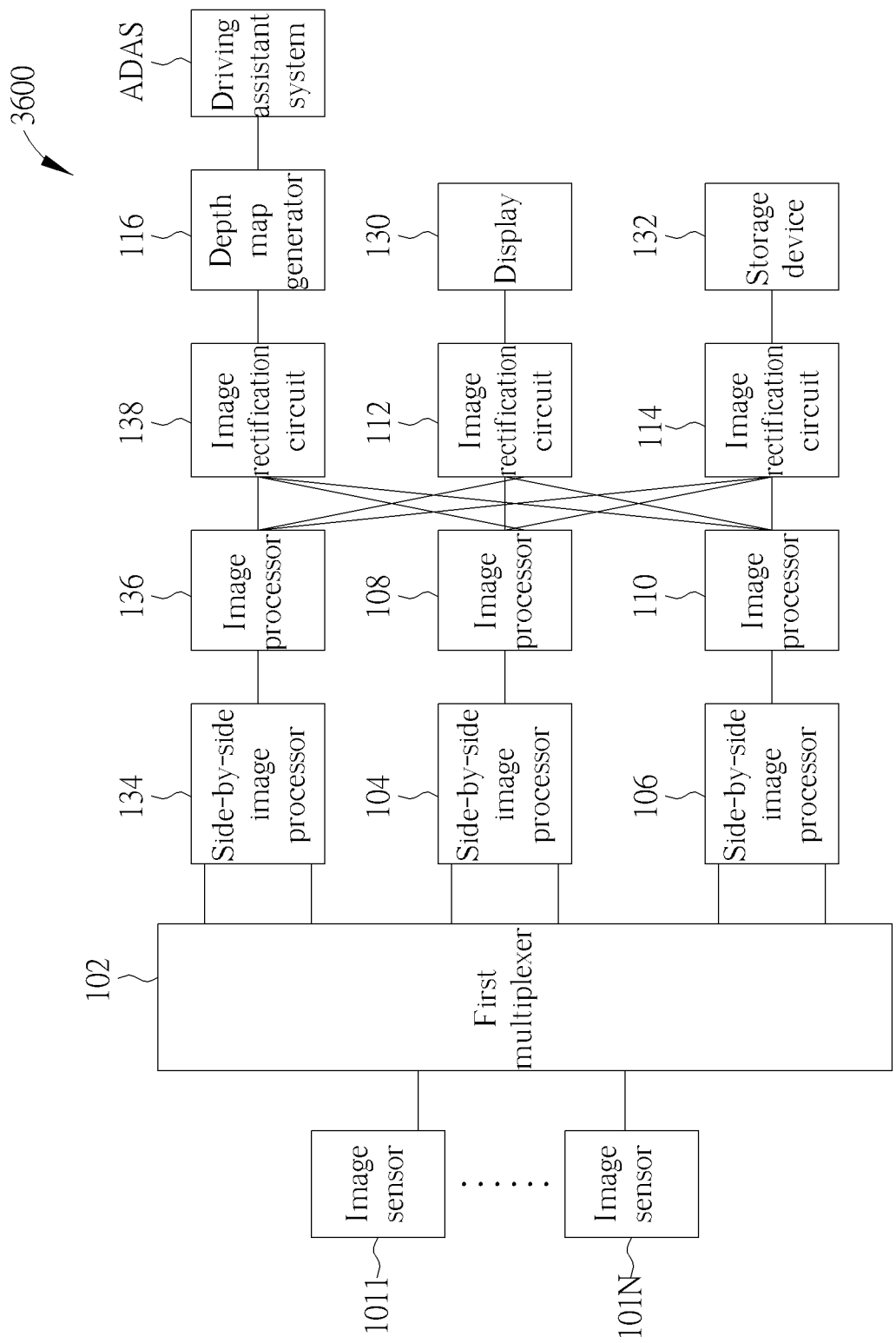
FIG. 36 is a diagram illustrating an image system for generating color images according to a twenty-first embodiment of the present invention.

Please refer to FIG. 36. FIG. 36 is a diagram illustrating an image system 3600 for generating color images according to a twenty-first embodiment of the present invention. As shown in FIG. 36, a difference between the image system 3600 and the image system 100 is that the image system 3600 further includes a display 130, a storage device 132, a side-by-side image processor 134, an image processor 136, and an image rectification circuit 138, but does not include the second multiplexer 118, wherein electrical connection relationships between a plurality of image sensors 1011-101N, a first multiplexer 102, side-by-side image processors 104, 106, 134, image processors 108, 110, 136, image rectification circuits 112, 114, 138, a depth map generator 116, the display 130, and the storage device 132 can be referred to FIG. 36, so further description thereof is omitted for simplicity. In addition, N is an integer not less than 2. In addition, depth maps generated by the depth map generator 116 can be outputted to a driving assistant system ADAS, and the driving assistant system ADAS can generate a warning signal or driving advice to a user of a car 3702 according to the depth maps generated by the depth map generator 116.

Figure 37A:
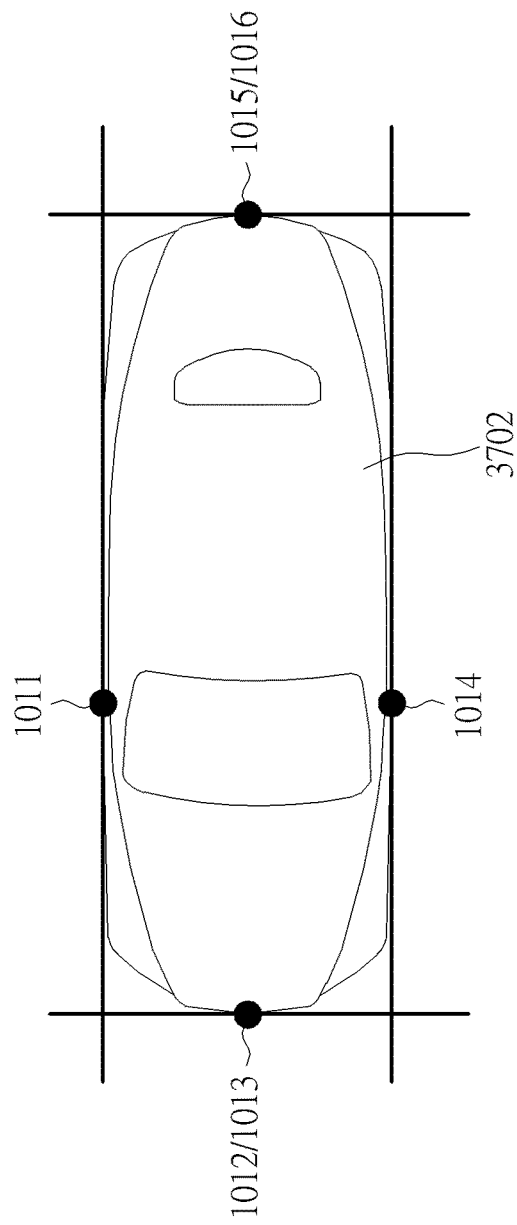
FIGS. 37A, 37B are diagrams illustrating installation positions of image sensors of the image system on the car according to a twenty-second embodiment of the present invention.
Figure 37B:
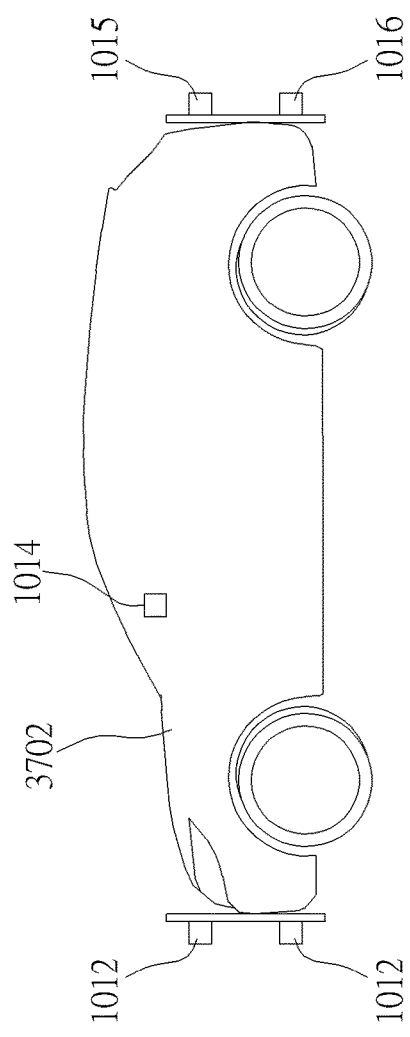
Figure 38:
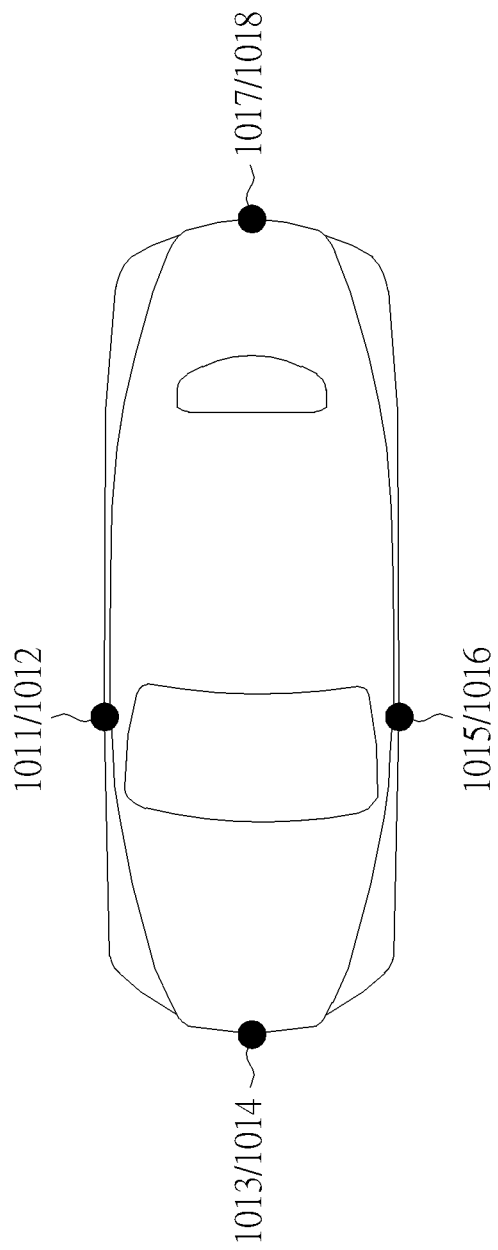
FIG. 38 is a diagram illustrating installation positions of eight image sensors of the image system on the car according to another embodiment of the present invention.

Please refer to FIGS. 37A, 37B. FIGS. 37A, 37B are diagrams illustrating installation positions of image sensors 1011-1016 of the image system 3600 on the car 3702 according to a twenty-second embodiment of the present invention, wherein the image sensors 1011-1016 are fisheye image sensors. As shown in FIG. 37A, according to the above-mentioned corresponding descriptions, images captured by the image sensors 1011-1016 are used for generating a 360 degree color image corresponding to the car 3702, images captured by the image sensors 1013, 1012 are used for generating a front depth map corresponding to a front of the car 3702, images captured by the image sensors 1015, 1016 are used for generating a rear depth map corresponding to a rear of the car 3702. That is, the image rectification circuit 112 executes image rectification on the images captured by the image sensors 1011-1016 according to first geometric space conversion to generate the 360 degree color image corresponding to the car 3702, wherein the first geometric space conversion at least includes image stitching, image alignment, image cropping, and so on, and the display 130 displays the 360 degree color image corresponding to the car 3702. In addition, the image rectification circuit 114 executes the image rectification on the images captured by the image sensors 1011-1016 according to second geometric space conversion to generate rectified color images corresponding to images captured by the image sensors 1011-1016, and the rectified color images corresponding to images captured by the image sensors 1011-1016 are transmitted to the storage device 132 and stored in the storage device 132. In addition, the image rectification circuit 138 executes the image rectification on an image pair captured by the image sensors 1012/1013 and an image pair captured by the image sensor 1015/1016 to generate corresponding rectified images according to third geometric space conversion, wherein the third geometric space conversion at least includes image alignment, and so on, and the depth map generator 116 utilizes the corresponding rectified images to generate depth maps and the depth maps are transmitted to the driving assistant system ADAS. In addition, in another embodiment of the present invention, the image system 3600 includes eight image sensors 1011-1018 (as shown in FIG. 38). Therefore, as shown in FIG. 38, according to the above-mentioned corresponding descriptions, images captured by the image sensors 1011-1018 not only can be used for generating the 360 degree color image corresponding to the car 3702, but can also be used for generating a 360 degree depth map corresponding to the car 3702.

To sum up, the image processor and the image system provided by the present invention utilize an image processor of at least one image processor included in the image system to generate luminance information represented by the first bit number corresponding to at least one image generated by at least one image sensor and at least one color image represented by the second bit number corresponding to the at least one image according to the at least one image, and utilize a depth map generator of at least one depth map generator included in the image system to generate at least one depth map corresponding to the at least one image according to the luminance information. Therefore, compared to the prior art, because the present invention can simultaneously provide the luminance information and the at least one color image, and have structure variability, the present invention can support at least one of generating depth maps, generating color images, generating 360 degree color images, generating 360 degree depth maps, fusing multiple depth maps, increasing a working range of a depth map, and cancelling an occlusion region of a depth map. In addition, although the first bit number is greater than the second bit number, because the present invention only utilizes the luminance information to generate depth maps, generate 360 degree depth maps, fuse multiple depth maps, increase a working range of a depth map, and cancel an occlusion region of a depth map, and data amount of gray levels corresponding to the luminance information is less, the present invention does not have any bandwidth problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image system for generating depth maps and color images, comprising:
    a plurality of image sensors;
    at least one image processor, wherein an image processor of the at least one image processor is coupled to at least one image sensor of the plurality of image sensors for generating luminance information represented by a first bit number and at least one color image represented by a second bit number according to at least one image captured by the at least one image sensor, wherein the at least one color image corresponds to the at least one image;
    at least one image rectification circuit, wherein an image rectification circuit of the at least one image rectification circuit is coupled to the image processor for executing image rectification on the luminance information represented by the first bit number and the at least one color image represented by the second bit number to generate rectified luminance information and at least one rectified color image respectively, and the rectified luminance information is represented by the first bit number and the at least one rectified color image is represented by the second bit number; and
    at least one depth map generating circuit, wherein a depth map generating circuit of the at least one depth map generating circuit is coupled to the image processor for generating a depth map corresponding to the at least one image according to the luminance information represented by the first bit number.

2. The image system of claim 1, wherein the first bit number is greater than the second bit number.

3. The image system of claim 1, further comprising:
    at least one side-by-side image processor, wherein a side-by-side image processor of the at least one sideby-side image processor is coupled between the at least one image sensor and the image processor for arranging the at least one image side by side.

4. The image system of claim 1, wherein the plurality of image sensors comprise two image sensors, two images generated by the two image sensors are used for generating a depth map corresponding to the two images and two color images corresponding to the two images, and the depth map corresponding to the two images is represented by the first bit number and the two color images are represented by the second bit number.

5. The image system of claim 4, wherein the two image sensors are bayer pattern image sensors or RGB-IR image sensors.

6. The image system of claim 1, wherein the plurality of image sensors comprise three image sensors, two images generated by two image sensors of the three image sensors are used for generating a depth map corresponding to the two images, an image generated by another image sensor of the three image sensors is used for generating a color image corresponding to the image, and the color image is represented by the second bit number, wherein the another image sensor is different from the two image sensors and is an RGB image sensor, and the two image sensors are IR image sensors.

7. The image system of claim 1, wherein the plurality of image sensors comprise three image sensors, a first image and a second image generated by a first image sensor and a second image sensor of the three image sensors are used for generating a depth map corresponding to the first image and the second image, a third image generated by a third image sensor of the three image sensors and the second image are used for generating a 360 degree color image corresponding to the second image and the third image, and the 360 degree color image is represented by the second bit number.

8. The image system of claim 1, wherein the plurality of image sensors comprise four image sensors, a first image and a second image generated by a first image sensor and a second image sensor of the four image sensors are used for generating a depth map corresponding to the first image and the second image, a third image and a fourth image generated by a third image sensor and a fourth image sensor of the four image sensors are used for generating a 360 degree color image corresponding to the third image and the fourth image, and the 360 degree color image is represented by the second bit number.

9. The image system of claim 1, wherein the plurality of image sensors comprise four image sensors, a first image and a second image generated by a first image sensor and a second image sensor of the four image sensors are used for generating a first 360 degree color image corresponding to the first image and the second image, a third image and a fourth image generated by a third image sensor and a fourth image sensor of the four image sensors are used for generating a second 360 degree color image corresponding to the third image and the fourth image, the first 360 degree color image and the second 360 degree color image are represented by the second bit number, and the first 360 degree color image and the second 360 degree color image are further used for generating a 360 degree depth map.

10. An image system for generating depth maps and color images, comprising:
a plurality of image sensors;
at least one image processor, wherein an image processor of the at least one image processor is coupled to at least one image sensor of the plurality of image sensors for generating luminance information represented by a first bit number and at least one color image represented by a second bit number according to at least one image captured by the at least one image sensor, wherein the at least one color image corresponds to the at least one image;
at least one depth map generating circuit, wherein a depth map generating circuit of the at least one depth map generating circuit is coupled to the image processor for generating a depth map corresponding to the at least one image according to the luminance information represented by the first bit number;
a mixing circuit fusing at least two depth maps generated by the at least one depth map generating circuit to generate a fused depth map corresponding to the at least two depth maps, wherein the at least two depth maps have different characteristics; and
a first mixing circuit fusing the fused depth map and at least one first depth map generated from outside of the image system to generate a first fused depth map corresponding to the fused depth map and the at least one first depth map.

11. The image system of claim 10, wherein the plurality of image sensors comprise three image sensors, the three image sensors forms two image capture pairs, two image pairs captured by the two image capture pairs are used for generating two depth maps corresponding to the two image capture pairs, and the mixing circuit fuses the two depth maps to generate a fused depth map corresponding to the two depth maps, wherein the two image capture pairs correspond to two different baselines.

12. The image system of claim 10, wherein the plurality of image sensors comprise three image sensors, the three image sensors form two image capture pairs, two image pairs captured by the two image capture pairs are used for generating a first depth map and a second depth map corresponding to the two image capture pairs, and when the first depth map comprises an occlusion region and a non-occlusion region, the mixing circuit corrects the occlusion region according to the second depth map.

13. The image system of claim 10, wherein the plurality of image sensors comprise two image sensors, at least one image rectification circuit further comprised in the image system scales first luminance information corresponding to two first images generated by the two image sensors to generate corresponding second luminance information, the at least one depth map generating circuit generates a first depth map and a second depth map according to the first luminance information and the corresponding second luminance information respectively, and the mixing circuit fuses the first depth map and the second depth map to generate a corresponding fused depth map.

14. The image system of claim 13, wherein a resolution of the first depth map is different from a resolution of the second depth map.

15. The image system of claim 10, wherein the plurality of image sensors comprise two image sensors, at least one image rectification circuit further comprised in the image system utilizes two block matching sampling frequencies to execute block matching on two first images generated by the two image sensors to generate a first luminance information and a second luminance information, the at least one depth map generating circuit generates a first depth map and a second depth map according to the first luminance information and the second luminance information, and the mixing circuit fuses the first depth map and the second depth map to generate a corresponding fused depth map, wherein the first depth map and the second depth map correspond to the two block matching sampling frequencies.

16. The image system of claim 15, wherein a resolution of the first depth map is different from a resolution of the second depth map.

17. The image system of claim 1, further comprising:
a mixing circuit fusing a first depth map generated by the at least one depth map generating circuit and at least one second depth map generated from outside of the image system to generate a fused depth map corresponding to the first depth map and the at least one second depth map.

* * * * *